US012650601B1

(12) United States Patent　　　　(10) Patent No.:　US 12,650,601 B1

Johnson et al.　　　　　　　　　　(45) Date of Patent:　　Jun. 9, 2026

---

(54) ELECTROCHROMIC LENS CONTROL FOR WEARABLE DEVICE

(71) Applicant: QUALCOMM Incorporated, San Diego, CA (US)

(72) Inventors: Kevin Johnson, Ramona, CA (US); Shrinivas Gopalan Uppili, San Diego, CA (US); Walker Curtis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/069,081

(22) Filed: Mar. 3, 2025

(51) Int. Cl.
　　*G02B 27/01*　　　(2006.01)
　　*G02C 7/10*　　　(2006.01)
　　*G09G 3/00*　　　(2006.01)

(52) U.S. Cl.
　　CPC ......... *G02B 27/0172* (2013.01); *G02C 7/101* (2013.01); *G09G 3/001* (2013.01); *G02B 2027/0118* (2013.01); *G02B 2027/014* (2013.01); *G02B 2027/0178* (2013.01); *G09G 2320/0626* (2013.01); *G09G 2320/066* (2013.01); *G09G 2360/144* (2013.01)

(58) Field of Classification Search
　　CPC ........ G02B 27/0172; G02B 2027/0118; G02B 2027/014; G02B 2027/0178; G02C 7/101; G09G 3/001; G09G 2320/0626; G09G 2320/066; G09G 2360/144
　　See application file for complete search history.

(56) References Cited

U.S. PATENT DOCUMENTS

| | | | | |
|---|---|---|---|---|
| 2015/0309312 A1* | 10/2015 | Alton | ..................... | G09G 3/001 |
| | | | | 345/592 |
| 2022/0197377 A1* | 6/2022 | Kim | ....................... | G06V 40/18 |
| 2023/0092317 A1* | 3/2023 | Lee | .................... | G02B 27/0172 |
| | | | | 359/630 |

OTHER PUBLICATIONS

Bauer J., et al., "Understanding the Requirements for Automotive Displays in Ambient Light Conditions", frontline technology, 2016, pp. 14-22.

Dusk: "The World's First App-Enabled Electrochromic Smart Sunglasses", Ampere, Example of 1st World Facing ALS Based Electronic Tinting Control Without Display Integrated, Oct. 22, 2021, 15 Pages.

* cited by examiner

*Primary Examiner* — Brent D Castiaux
(74) *Attorney, Agent, or Firm* — Seyfarth Shaw LLP

(57)　　　　　　ABSTRACT

A computer processing method includes receiving sensor data from a number of sensors comprising a first sensor facing away from a user, and a second sensor facing towards the user. The method also includes controlling an electronic tinting component associated with a translucent optical element based on the sensor data. The electronic tinting component adjusts optical element tint occlusion. The method further includes controlling at least one of a display brightness, display contrast, color composition, or field of view of a light engine assembly based on the sensor data. The method still further includes displaying content with the light engine assembly.

18 Claims, 13 Drawing Sheets

1200

200

6DoF (L)

LE (L)

Hinge (L)

Main Board

Speaker (L)

WG (L)

ALS

LED

RGB
Camera

WG (R)

450

6DoF (R)

Rigid FPC

LE (R)

Hinge (R)

Button

Sub board

Frame Flex #2

Battery

Capacitive
Touch Sensor

Speaker (R)

502

FULLY CONNECTED

504

LOCALLY CONNECTED

510

512

514

516

506

CONVOLUTIONAL

508

1200 —

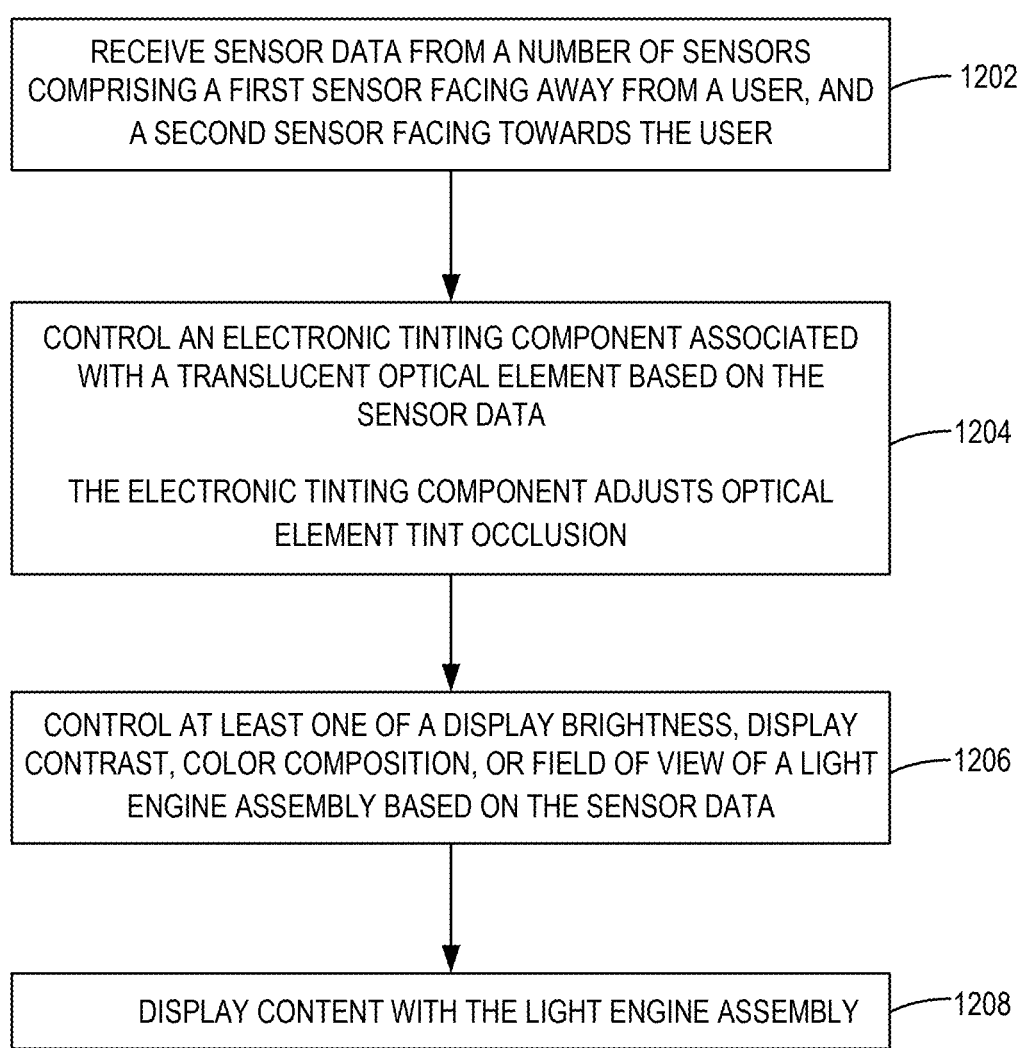

RECEIVE SENSOR DATA FROM A NUMBER OF SENSORS COMPRISING A FIRST SENSOR FACING AWAY FROM A USER, AND A SECOND SENSOR FACING TOWARDS THE USER ⟞ 1202

CONTROL AN ELECTRONIC TINTING COMPONENT ASSOCIATED WITH A TRANSLUCENT OPTICAL ELEMENT BASED ON THE SENSOR DATA

THE ELECTRONIC TINTING COMPONENT ADJUSTS OPTICAL ELEMENT TINT OCCLUSION ⟞ 1204

CONTROL AT LEAST ONE OF A DISPLAY BRIGHTNESS, DISPLAY CONTRAST, COLOR COMPOSITION, OR FIELD OF VIEW OF A LIGHT ENGINE ASSEMBLY BASED ON THE SENSOR DATA ⟞ 1206

DISPLAY CONTENT WITH THE LIGHT ENGINE ASSEMBLY ⟞ 1208

*FIG. 12*

ELECTROCHROMIC LENS CONTROL FOR WEARABLE DEVICE

FIELD OF THE DISCLOSURE

The present disclosure relates generally to wearable devices, and more specifically to methods and apparatuses for electrochromic lens (or film) control to reduce power, improve display brightness, and improve display color and contrast for an optically see through wearable device, such as augmented reality (AR) glasses.

BACKGROUND

Augmented reality (AR) merges the real world with virtual objects to support realistic, intelligent, and personalized experiences. Conventional augmented reality applications provide a live view of a real-world environment whose elements may be augmented by computer-generated sensory input such as video, sound, graphics, or global positioning system (GPS) data. With such applications, a view of reality may be modified by a computing device to enhance a user's perception of reality and provide more information about the user's environment. Virtual reality (VR) simulates physical presence in real or imagined worlds, and enables the user to interact in that world. Realizing AR and VR requires the next level of artificial intelligence (AI) and connectivity within the thermal and power envelopes of a wearable device, such as eyeglasses.

SUMMARY

In aspects of the present disclosure, a computer processing method includes receiving sensor data from a number of sensors comprising a first sensor facing away from a user, and a second sensor facing towards the user. The method also includes controlling an electronic tinting component associated with a translucent optical element based on the sensor data. The electronic tinting component adjusts optical element tint occlusion. The method further includes controlling at least one of a display brightness, display contrast, color composition, or field of view of a light engine assembly based on the sensor data. The method still further includes displaying content with the light engine assembly.

Other aspects of the present disclosure are directed to an apparatus. The apparatus has one or more memories and one or more processors coupled to the one or more memories. The processor(s) is configured to receive sensor data from a number of sensors comprising a first sensor facing away from a user, and a second sensor facing towards the user. The processor(s) is also configured to control an electronic tinting component associated with a translucent optical element based on the sensor data. The electronic tinting component adjusts optical element tint occlusion. The processor(s) is further configured to control at least one of a display brightness, display contrast, color composition, or field of view of a light engine assembly based on the sensor data. The processor(s) is still further configured to display content with the light engine assembly.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

The details of one or more examples of the disclosure are set forth in the accompanying drawings and the description below. Other features, objects, and advantages of the disclosure will be apparent from the description and drawings, and from the claims.

FIG. 12 is a flow diagram illustrating an example process for controlling an electrochromic lens (or film) for augmented reality glasses, in accordance with various aspects of the present disclosure.

DETAILED DESCRIPTION

Figure 1:
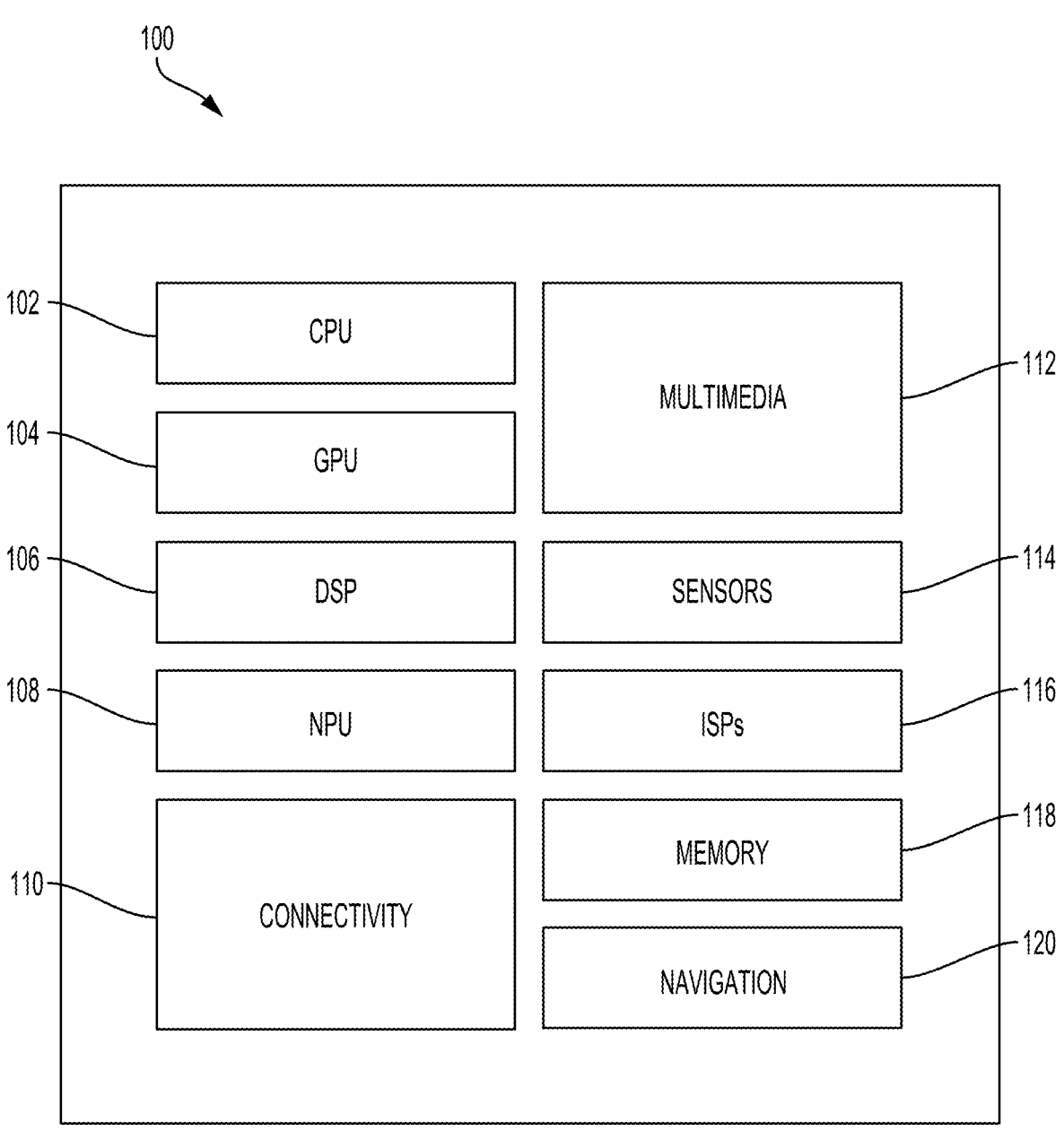
FIG. 1 illustrates an example implementation of a system-on-a-chip (SoC).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings one skilled in the art should appreciate that the scope of this disclosure is intended to cover any aspect of the systems, apparatuses, computer program products, and methods disclosed, whether implemented independently of, or combined with, other aspects of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. Any aspect disclosed may be embodied by one or more elements of a claim.

Although various aspects are described, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general-purpose GPUs (GPGPUs), central processing units (CPUs), application processors, digital signal processors (DSPs), reduced instruction set computing (RISC) processors, system-on-a-chips (SoCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described, one or more techniques may refer to an application (e.g., software) being configured to perform one or more functions. In such examples, the application may be stored on a memory (e.g., on-chip memory of a processor, system memory, or any other memory). Hardware described, such as a processor may be configured to execute the application. For example, the application may be described as including code that, when executed by the hardware, causes the hardware to perform one or more techniques described. As an example, the hardware may access the code from a memory and executed the code accessed from the memory to perform one or more techniques described. In some examples, components are identified in this disclosure. In such examples, the components may be hardware, software, or a combination thereof. The components may be separate components or sub-components of a single component.

Accordingly, in one or more examples described, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for integrating subsystems or modules that are located on physically separated printed circuit boards (PCBs). For example, augmented reality or virtual reality (AR/VR) devices may have modules located physically distant from one another. However, the present disclosure is equally applicable to any type of system with modules or PCBs spaced apart but electrically connected (e.g., with a flex cable, a flex PCB, a coaxial cable, a rigid PCB, etc.) In some aspects, the solutions integrate at least one slave subsystem with a master subsystem by implementing all control and status monitor functions between the subsystems. For example, certain bi-directional functions may be implemented between master and slave subsystems, such as power on triggers, reset triggers, shutdown triggers, fault propagation, and fail-safe reset triggers.

As used, the term "coder" may generically refer to an encoder and/or decoder. For example, reference to a "content coder" may include reference to a content encoder and/or a content decoder. Similarly, as used, the term "coding" may generically refer to encoding and/or decoding. As used, the terms "encode" and "compress" may be used interchangeably. Similarly, the terms "decode" and "decompress" may be used interchangeably.

As used, instances of the term "content" may refer to the term "video," "graphical content," "image," and vice versa. This is true regardless of whether the terms are being used as an adjective, noun, or other part of speech. For example, reference to a "content coder" may include reference to a "video coder," "graphical content coder," or "image coder," and reference to a "video coder," "graphical content coder," or "image coder" may include reference to a "content coder." As another example, reference to a processing unit providing content to a content coder may include reference to the processing unit providing graphical content to a video encoder. In some examples, the term "graphical content" may refer to a content produced by one or more processes of a graphics processing pipeline. In some examples, the term "graphical content" may refer to a content produced by a processing unit configured to perform graphics processing. In some examples, the term "graphical content" may refer to a content produced by a graphics processing unit.

Instances of the term "content" may refer to graphical content or display content. In some examples, the term "graphical content" may refer to a content generated by a processing unit configured to perform graphics processing. For example, the term "graphical content" may refer to content generated by one or more processes of a graphics processing pipeline. In some examples, the term "graphical content" may refer to content generated by a graphics processing unit. In some examples, as used herein, the term "display content" may refer to content generated by a processing unit configured to perform displaying processing. In some examples, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (e.g., the frame includes two or more layers, and the frame that includes two or more layers may subsequently be blended)

As referenced, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

For a mobile device, such as a mobile telephone, a single printed circuit board (PCB) may support multiple components including a CPU, GPU, DSP, etc. For an augmented reality (AR) or virtual reality (VR) device, the components may be located on different PCBs due to the form factor of the AR or VR device. For example, the AR or VR device may be in the form of eyeglasses. In an example implementation, a main SoC (also referred to as a main processor) and a main power management integrated circuit (PMIC) may reside on a first PCB in one of the arms of the eyeglasses. A camera and sensor co-processor and associated PMIC may reside on a second PCB near the bridge of the eyeglasses. A connectivity processor and associated PMIC may reside on a third PCB on the other arm of the eyeglasses.

For wider market adoption, augmented reality (AR) glasses, artificial intelligence glasses, or smart glasses (more generally referred to as AR glasses) should be lightweight with a small form factor (e.g., sleek form factor). In fact, original equipment manufacturers (OEMs) may specify maximum dimension limits to achieve the sleek form factor. The sleek form factor, however, restricts chip count, chip package size, battery size, and battery capacity. The printed circuit board (PCB) inside the side arm drives the overall product size. The main system-on-a-chip (SoC) and power management integrated circuit (PMIC) package sizes dictate the overall PCB size on each arm. To achieve dimension targets, preferably only one PMIC with associated passive devices should be placed on the PCB due to a Y-dimension limit. Moreover, lower power consumption may improve the user experience by allowing a lower battery capacity and resulting smaller battery with a lower weight, and therefore more comfortable device.

Outdoor environments often have high levels of ambient light, especially in direct sunlight. These high levels of ambient light can wash out a projected image, making it difficult to see. To achieve sufficient brightness in outdoor conditions, microprojectors significantly increase their output, which in turn increases power consumption. The contrast ratio, which is the difference between the brightest and darkest parts of an image, significantly affects image quality. High levels of ambient light can reduce the effective contrast ratio, which is inherently low in optically see through or transparent display systems, making the image appear less vibrant, less bright, and less detailed. Direct sunlight can cause glare on the lens and add reflections in the projection medium, further diminishing image quality.

Aspects of the present disclosure achieve significant power savings and improve display image quality using ambient light sensors (ALS), an electrochromic (EC) film or lens, a digital-to-analog converter (DAC), a display processor unit (DPU), and a machine learning embedded neural processing unit (eNPU). Microprojector systems with optically see through lenses, or waveguides, exhibit high power consumption under varying lighting conditions. While indoor lighting allows microprojectors to generate display images with reasonable power consumption for wearable glasses or goggles, outdoor lighting conditions necessitate a substantial increase in output brightness. This increase in brightness results in a corresponding rise in power consumption from the device battery.

Aspects of the present disclosure introduce closed loop control of electrochromic film and displays on AR glass display systems by assessing user, scene, and perception information. The techniques of the present disclosure combine display and electrochromic film (or lens) settings for best viewing with the lowest power consumption. Per eye display settings may be controlled for binocular systems. That is, each left and right display system may be independently controlled in a binocular AR glass display system. Moreover, content and the user interface (UI) may be dynamically adapted based on ambient lighting conditions. User, environmental, and scene perception may be input to a machine learning (ML) engine to learn usage patterns and infer optimal settings. Ambient scene lighting may be detected with multiple sensors.

A self-learning eNPU leverages sensor inputs and machine learning techniques to dynamically adjust the electrochromic film/lens tint and the microprojector color and brightness output based on real-time ambient light sensing, usage patterns, and environmental conditions. By continuously analyzing the display's operational scene data, user sensors, and environmental sensors, the eNPU predicts and adapts to the optimal voltage levels specified for different display states, thereby reducing power waste and improving display image quality. For image quality, with improvements in contrast, color composition, and brightness, the user experience with outdoor display readability is enhanced with significant power savings. The power management techniques of the present disclosure not only extend the battery life of portable devices but also contribute to the development of more sustainable and energy-efficient electronic systems.

FIG. 1 illustrates an example implementation of a system-on-a-chip (SoC) 100 on a single printed circuit board (PCB). The host SoC 100 includes processing blocks tailored to specific functions, such as a connectivity block 110. The connectivity block 110 may include fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 100 includes various processing units that support multi-threaded operation. For the configuration shown in FIG. 1, the SoC 100 includes a multi-core central processing unit (CPU) 102, a graphics processor unit (GPU) 104, a digital signal processor (DSP) 106, and a neural processor unit (NPU) 108. The SoC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multimedia engine 112 support various functions such as video, audio, graphics, extended reality (XR) gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set. In some implementations, an AR SoC may not include the embedded navigation and connectivity modules 120, 110.

Figure 2:
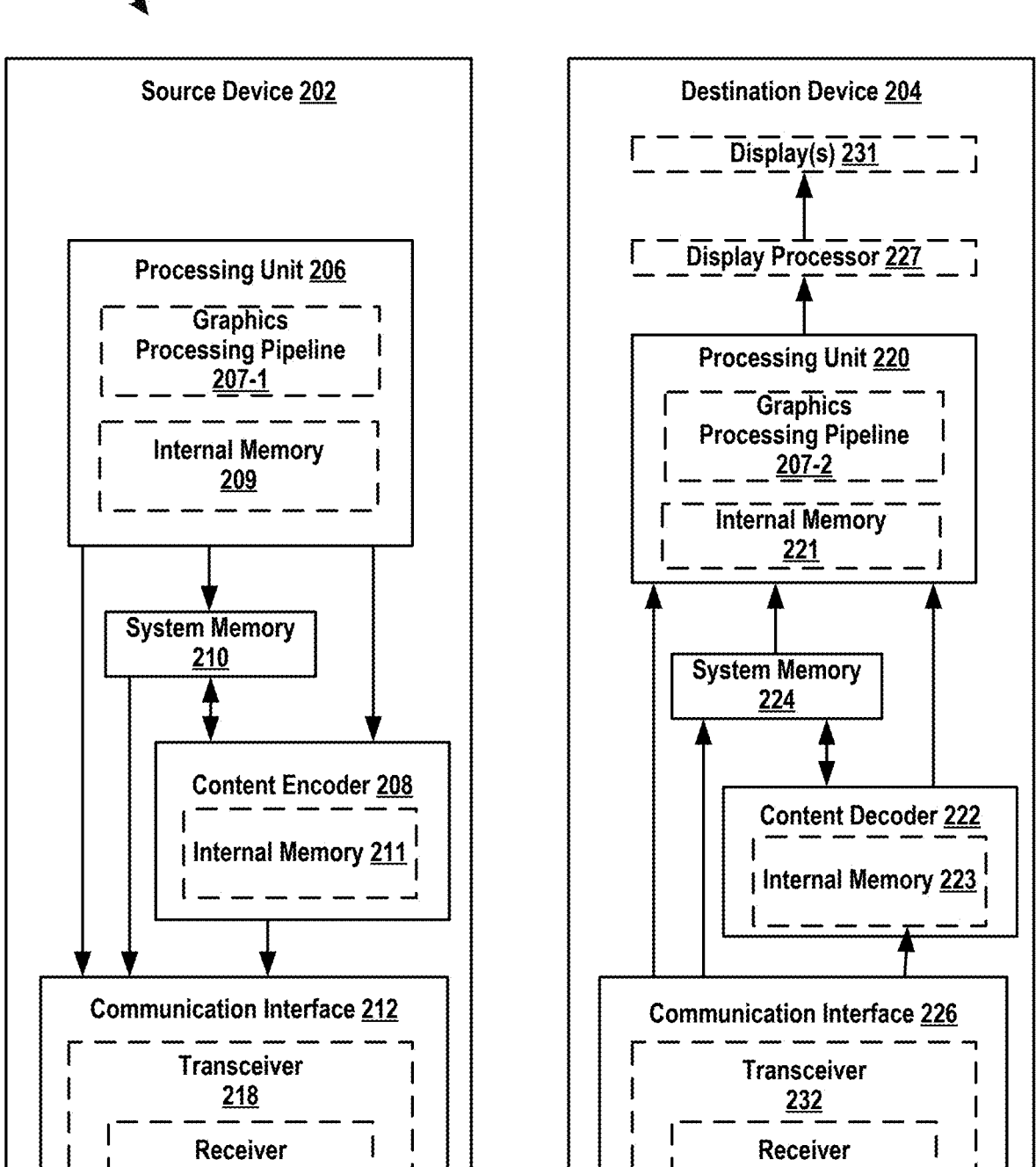
FIG. 2 is a block diagram that illustrates an example content generation and coding system to implement augmented reality (AR), extended reality (XR) or virtual reality (VR) applications, in accordance with various aspects of the present disclosure.

FIG. 2 is a block diagram that illustrates an example augmented reality (AR), extended reality (XR) or virtual reality (VR) system 200 configured to implement AR, XR, or VR applications, according to aspects of the present disclosure. The system 200 includes a source device 202 and a destination device 204. In accordance with the techniques described, the source device 202 may be configured to encode, using the content encoder 208, graphical content generated by the processing unit 206 prior to transmission to the destination device 204. The content encoder 208 may be configured to output a bitstream having a bit rate. The processing unit 206 may be configured to control and/or influence the bit rate of the content encoder 208 based on how the processing unit 206 generates graphical content.

The source device 202 may include one or more components (or circuits) for performing various functions described herein. The destination device 204 may include one or more components (or circuits) for performing various functions described. In some examples, one or more components of the source device 202 may be components of a system-on-a-chip (SoC). Similarly, in some examples, one or more components of the destination device 204 may be components of an SoC.

The source device 202 may include one or more components configured to perform one or more techniques of this disclosure. In the example shown, the source device 202 may include a processing unit 206, a content encoder 208, a system memory 210, and a communication interface 212. The processing unit 206 may include an internal memory 209. The processing unit 206 may be configured to perform graphics processing, such as in a graphics processing pipeline 207-1. The content encoder 208 may include an internal memory 211.

Memory external to the processing unit 206 and the content encoder 208, such as system memory 210, may be accessible to the processing unit 206 and the content encoder 208. For example, the processing unit 206 and the content encoder 208 may be configured to read from and/or write to external memory, such as the system memory 210. The processing unit 206 and the content encoder 208 may be communicatively coupled to the system memory 210 over a bus. In some examples, the processing unit 206 and the content encoder 208 may be communicatively coupled to each other over the bus or a different connection.

The content encoder 208 may be configured to receive graphical content from any source, such as the system memory 210 and/or the processing unit 206. The system memory 210 may be configured to store graphical content generated by the processing unit 206. For example, the processing unit 206 may be configured to store graphical content in the system memory 210. The content encoder 208 may be configured to receive graphical content (e.g., from the system memory 210 and/or the processing unit 206) in the form of pixel data. Otherwise described, the content encoder 208 may be configured to receive pixel data of graphical content produced by the processing unit 206. For example, the content encoder 208 may be configured to receive a value for each component (e.g., each color component) of one or more pixels of graphical content. As an example, a pixel in the red, green, blue (RGB) color space may include a first value for the red component, a second value for the green component, and a third value for the blue component.

The internal memory 209, the system memory 210, and/or the internal memory 211 may include one or more volatile or non-volatile memories or storage devices. In some examples, internal memory 209, the system memory 210, and/or the internal memory 211 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 209, the system memory 210, and/or the internal memory 211 may be a non-transitory storage medium according to some examples. The term "non-transitory" may indicate that the storage medium is not embodied in a carrier wave or a propagated signal. However, the term "non-transitory" should not be interpreted to mean that internal memory 209, the system memory 210, and/or the internal memory 211 is non-movable or that its contents are static. As one example, the system memory 210 may be removed from the source device 202 and moved to another device. As another example, the system memory 210 may not be removable from the source device 202.

The processing unit 206 may be a central processing unit (CPU), a graphics processing unit (GPU), a general-purpose GPU (GPGPU), or any other processing unit that may be configured to perform graphics processing. In some examples, the processing unit 206 may be integrated into a motherboard of the source device 202. In some examples, the processing unit 206 may be present on a graphics card that is installed in a port in a motherboard of the source device 202, or may be otherwise incorporated within a peripheral device configured to interoperate with the source device 202.

The processing unit 206 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 206 may store instructions for the software in a suitable, non-transitory computer-readable storage medium (e.g., internal memory 209), and may execute the instructions in hardware using one or more processors to perform the techniques of this disclosure. Any of the foregoing (including hardware, software, a combination of hardware and software, etc.) may be considered to be one or more processors.

The content encoder 208 may be any processing unit configured to perform content encoding. In some examples, the content encoder 208 may be integrated into a motherboard of the source device 202. The content encoder 208 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 208 may store instructions for the software in a suitable, non-transitory computer-readable storage medium (e.g., internal memory 211), and may execute the instructions in hardware using one or more processors to perform the techniques of this disclosure. Any of the foregoing (including hardware, software, a combination of hardware and software, etc.) may be considered to be one or more processors.

The communication interface 212 may include a receiver 214 and a transmitter 216. The receiver 214 may be configured to perform any receiving function described with respect to the source device 202. For example, the receiver 214 may be configured to receive information from the destination device 204, which may include a request for content. In some examples, in response to receiving the request for content, the source device 202 may be configured to perform one or more techniques described, such as produce or otherwise generate graphical content for delivery to the destination device 204. The transmitter 216 may be configured to perform any transmitting function described herein with respect to the source device 202. For example, the transmitter 216 may be configured to transmit encoded content to the destination device 204, such as encoded graphical content produced by the processing unit 206 and the content encoder 208 (e.g., the graphical content is produced by the processing unit 206, which the content encoder 208 receives as input to produce or otherwise generate the encoded graphical content). The receiver 214 and the transmitter 216 may be combined into a transceiver 218. In such examples, the transceiver 218 may be configured to perform any receiving function and/or transmitting function described with respect to the source device 202.

The destination device 204 may include one or more components configured to perform one or more techniques of this disclosure. In the example shown, the destination device 204 may include a processing unit 220, a content decoder 222, a system memory 224, a communication interface 226, and one or more displays 231. Reference to the displays 231 may refer to the one or more displays 231. For example, the displays 231 may include a single display or multiple displays. The displays 231 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 220 may include an internal memory 221. The processing unit 220 may be configured to perform graphics processing, such as in a graphics processing pipeline 207-2. The content decoder 222 may include an internal memory 223. In some examples, the destination device 204 may include a display processor, such as the display processor 227, to perform one or more display processing techniques on one or more frames generated by the processing unit 220 before presentment by the one or more displays 231. The display processor 227 may be configured to perform display processing. For example, the display processor 227 may be configured to perform one or more display processing techniques on one or more frames generated by the processing unit 220. The one or more displays 231 may be configured to display content that was generated using decoded content. For example, the display processor 227 may be configured to process one or more frames generated by the processing unit 220, where the one or more frames are generated by the processing unit 220 by using decoded content that was derived from encoded content received from the source device 202. In turn the display processor 227 may be configured to perform display processing on the one or more frames generated by the processing unit 220. The one or more displays 231 may be configured to display or otherwise present frames processed by the display processor 227. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 220 and the content decoder 222, such as system memory 224, may be accessible to the processing unit 220 and the content decoder 222. For example, the processing unit 220 and the content decoder 222 may be configured to read from and/or write to external memory, such as the system memory 224. The processing unit 220 and the content decoder 222 may be communicatively coupled to the system memory 224 over a bus. In some examples, the processing unit 220 and the content decoder 222 may be communicatively coupled to each other over the bus or a different connection.

The content decoder 222 may be configured to receive graphical content from any source, such as the system memory 224 and/or the communication interface 226. The system memory 224 may be configured to store received encoded graphical content, such as encoded graphical content received from the source device 202. The content decoder 222 may be configured to receive encoded graphical content (e.g., from the system memory 224 and/or the communication interface 226) in the form of encoded pixel data. The content decoder 222 may be configured to decode encoded graphical content.

The internal memory 221, the system memory 224, and/or the internal memory 223 may include one or more volatile or non-volatile memories or storage devices. In some examples, internal memory 221, the system memory 224, and/or the internal memory 223 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 221, the system memory 224, and/or the internal memory 223 may be a non-transitory storage medium according to some examples. The term "non-transitory" may indicate that the storage medium is not embodied in a carrier wave or a propagated signal. However, the term "non-transitory" should not be interpreted to mean that internal memory 221, the system memory 224, and/or the internal memory 223 is non-movable or that its contents are static. As one example, the system memory 224 may be removed from the destination device 204 and moved to another device. As another example, the system memory 224 may not be removable from the destination device 204.

The processing unit 220 may be a central processing unit (CPU), a graphics processing unit (GPU), a general-purpose GPU (GPGPU), or any other processing unit that may be configured to perform graphics processing. In some examples, the processing unit 220 may be integrated into a motherboard of the destination device 204. In some examples, the processing unit 220 may be present on a graphics card that is installed in a port in a motherboard of the destination device 204, or may be otherwise incorporated within a peripheral device configured to interoperate with the destination device 204.

The processing unit 220 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 220 may store instructions for the software in a suitable, non-transitory computer-readable storage medium (e.g., internal memory 221), and may execute the instructions in hardware using one or more processors to perform the techniques of this disclosure. Any of the foregoing (including hardware, software, a combination of hardware and software, etc.) may be considered to be one or more processors.

The content decoder 222 may be any processing unit configured to perform content decoding. In some examples, the content decoder 222 may be integrated into a motherboard of the destination device 204. The content decoder 222 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content decoder 222 may store instructions for the software in a suitable, non-transitory computer-readable storage medium (e.g., internal memory 223), and may execute the instructions in hardware using one or more processors to perform the techniques of this disclosure. Any of the foregoing (including hardware, software, a combination of hardware and software, etc.) may be considered to be one or more processors.

The communication interface 226 may include a receiver 228 and a transmitter 230. The receiver 228 may be configured to perform any receiving function described herein with respect to the destination device 204. For example, the receiver 228 may be configured to receive information from the source device 202, which may include encoded content, such as encoded graphical content produced or otherwise generated by the processing unit 206 and the content encoder 208 of the source device 202 (e.g., the graphical content is produced by the processing unit 206, which the content encoder 208 receives as input to produce or otherwise generate the encoded graphical content). As another example, the receiver 228 may be configured to receive position information from the source device 202, which may be encoded or unencoded (e.g., not encoded). In some examples, the destination device 204 may be configured to decode encoded graphical content received from the source device 202 in accordance with the techniques described herein. For example, the content decoder 222 may be configured to decode encoded graphical content to produce or otherwise generate decoded graphical content. The processing unit 220 may be configured to use the decoded graphical content to produce or otherwise generate one or more frames for presentment on the one or more displays 231. The transmitter 230 may be configured to perform any transmitting function described herein with respect to the destination device 204. For example, the transmitter 230 may be configured to transmit information to the source device 202, which may include a request for content. The receiver 228 and the transmitter 230 may be combined into a transceiver 232. In such examples, the transceiver 232 may be configured to perform any receiving function and/or transmitting function described herein with respect to the destination device 204.

The content encoder 208 and the content decoder 222 of XR gaming system 200 represent examples of computing components (e.g., processing units) that may be configured to perform one or more techniques for encoding content and decoding content in accordance with various examples described in this disclosure, respectively. In some examples, the content encoder 208 and the content decoder 222 may be configured to operate in accordance with a content coding standard, such as a video coding standard, a display stream compression standard, or an image compression standard.

As shown in FIG. 2, the source device 202 may be configured to generate encoded content. Accordingly, the source device 202 may be referred to as a content encoding device or a content encoding apparatus. The destination device 204 may be configured to decode the encoded content generated by source device 202. Accordingly, the destination device 204 may be referred to as a content decoding device or a content decoding apparatus. In some examples, the source device 202 and the destination device 204 may be separate devices, as shown. In other examples, source device 202 and destination device 204 may be on or part of the same computing device. In either example, a graphics processing pipeline may be distributed between the two devices. For example, a single graphics processing pipeline may include a plurality of graphics processes. The graphics processing pipeline 207-1 may include one or more graphics processes of the plurality of graphics processes. Similarly, graphics processing pipeline 207-2 may include one or more processes graphics processes of the plurality of graphics processes. In this regard, the graphics processing pipeline 207-1 concatenated or otherwise followed by the graphics processing pipeline 207-2 may result in a full graphics processing pipeline. Otherwise described, the graphics processing pipeline 207-1 may be a partial graphics processing pipeline and the graphics processing pipeline 207-2 may be a partial graphics processing pipeline that, when combined, result in a distributed graphics processing pipeline.

In some examples, a graphics process performed in the graphics processing pipeline 207-1 may not be performed or otherwise repeated in the graphics processing pipeline 207-2. For example, the graphics processing pipeline 207-1 may include receiving first position information corresponding to a first orientation of a device. The graphics processing pipeline 207-1 may also include generating first graphical content based on the first position information. Additionally, the graphics processing pipeline 207-1 may include generating motion information for warping the first graphical content. The graphics processing pipeline 207-1 may further include encoding the first graphical content. Also, the graphics processing pipeline 207-1 may include providing the motion information and the encoded first graphical content. The graphics processing pipeline 207-2 may include providing first position information corresponding to a first orientation of a device. The graphics processing pipeline 207-2 may also include receiving encoded first graphical content generated based on the first position information. Further, the graphics processing pipeline 207-2 may include receiving motion information. The graphics processing pipeline 207-2 may also include decoding the encoded first graphical content to generate decoded first graphical content. Also, the graphics processing pipeline 207-2 may include warping the decoded first graphical content based on the motion information. By distributing the graphics processing pipeline between the source device 202 and the destination device 204, the destination device may be able to, in some examples, present graphical content that it otherwise would not be able to render; and, therefore, could not present. Other example benefits are described throughout this disclosure.

As described, a device, such as the source device 202 and/or the destination device 204, may refer to any device, apparatus, or system configured to perform one or more techniques described. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 202 may be configured to communicate with the destination device 204. For example, destination device 204 may be configured to receive encoded content from the source device 202. In some example, the communication coupling between the source device 202 and the destination device 204 is shown as link 234. Link 234 may comprise any type of medium or device capable of moving the encoded content from source device 202 to the destination device 204.

In the example of FIG. 2, link 234 may comprise a communication medium to enable the source device 202 to transmit encoded content to destination device 204 in real-time. The encoded content may be modulated according to a communication standard, such as a wireless communication protocol, and transmitted to destination device 204. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 202 to the destination device 204. In other examples, link 234 may be a point-to-point connection between source device 202 and destination device 204, such as a wired or wireless display link connection (e.g., a high-definition multimedia interface (HDMI) link, a DisplayPort link, mobile industry processor interface (MIPI) display serial interface (DSI) link, or another link over which encoded content may traverse from the source device 202 to the destination device 204.

In another example, the link 234 may include a storage medium configured to store encoded content generated by the source device 202. In this example, the destination device 204 may be configured to access the storage medium. The storage medium may include a variety of locally-accessed data storage media such as Blu-ray discs, DVDs, CD-ROMs, flash memory, or other suitable digital storage media for storing encoded content.

In another example, the link 234 may include a server or another intermediate storage device configured to store encoded content generated by the source device 202. In this example, the destination device 204 may be configured to access encoded content stored at the server or other intermediate storage device. The server may be a type of server capable of storing encoded content and transmitting the encoded content to the destination device 204.

Devices described may be configured to communicate with each other, such as the source device 202 and the destination device 204. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to multiple client devices. As another example, any device described configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices are inclusive of more than two devices. For example, a first device may communicatively couple with a second device and the first device may communicatively couple with a third device. In such an example, the first device may be a server.

With reference to FIG. 2, the source device 202 may be described as being communicatively coupled to the destination device 204. In some examples, the term "communicatively coupled" may refer to a communication connection, which may be direct or indirect. The link 234 may, in some examples, represent a communication coupling between the source device 202 and the destination device 204. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 202, may be configured to unicast, broadcast, multicast, or otherwise transmit information (e.g., encoded content) to one or more other devices (e.g., one or more destination devices, which includes the destination device 204). The destination device 204 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described, such as the source device 202 and the destination device 204, may be configured to operate in accordance with one or more communication protocols. For example, the source device 202 may be configured to communicate with (e.g., receive information from and/or transmit information to) the destination device 204 using one or more communication protocols. In such an example, the source device 202 may be described as communicating with the destination device 204 over a connection. The connection may be compliant or otherwise be in accordance with a communication protocol. Similarly, the destination device 204 may be configured to communicate with (e.g., receive information from and/or transmit information to) the source device 202 using one or more communication protocols. In such an example, the destination device 204 may be described as communicating with the source device 202 over a connection. The connection may be compliant or otherwise be in accordance with a communication protocol.

The term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, 5G, or 6G.

With reference to FIG. 2, the content encoder 208 may be configured to encode graphical content. In some examples, the content encoder 208 may be configured to encode graphical content as one or more video frames of AR, XR, or VR content. When the content encoder 208 encodes content, the content encoder 208 may generate a bitstream. The bitstream may have a bit rate, such as bits/time unit, where time unit is any time unit, such as second or minute. The bitstream may include a sequence of bits that form a coded representation of the graphical content and associated data. To generate the bitstream, the content encoder 208 may be configured to perform encoding operations on pixel data, such as pixel data corresponding to a shaded texture atlas. For example, when the content encoder 208 performs encoding operations on image data (e.g., one or more blocks of a shaded texture atlas) provided as input to the content encoder 208, the content encoder 208 may generate a series of coded images and associated data. The associated data may include a set of coding parameters such as a quantization parameter (QP).

As shown in FIG. 1, a single printed circuit board (PCB) may support multiple components of the SoC 100, including the CPU 102, GPU 104, DSP 106, etc. For an AR or VR device, the components may be located on different PCBs.

Figure 3:
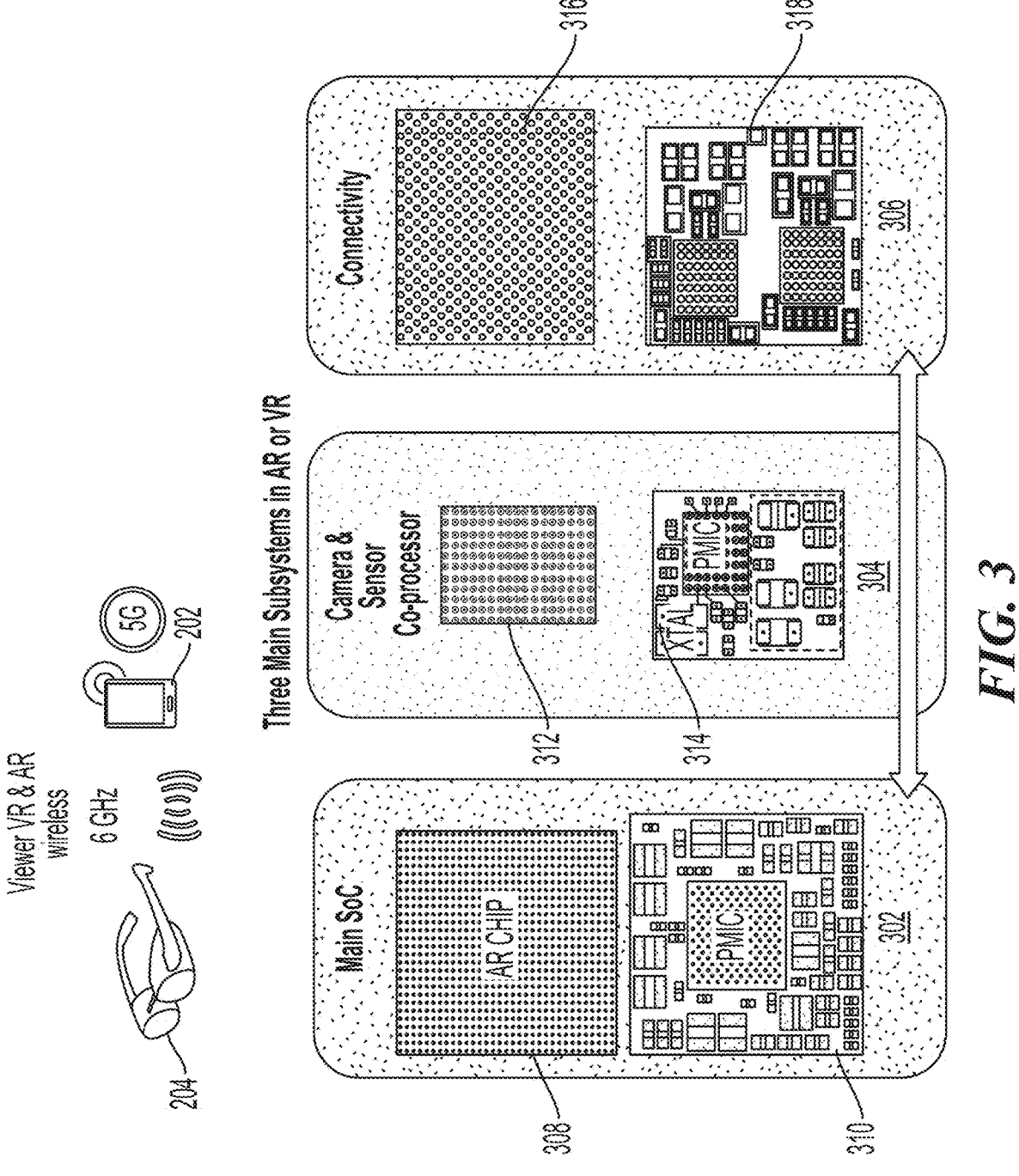
FIGS. 3, 4A, and 4B are diagrams illustrating placement of components in a wearable device with an eyeglasses form factor, in accordance with various aspects of the present disclosure.
Figure 4A:
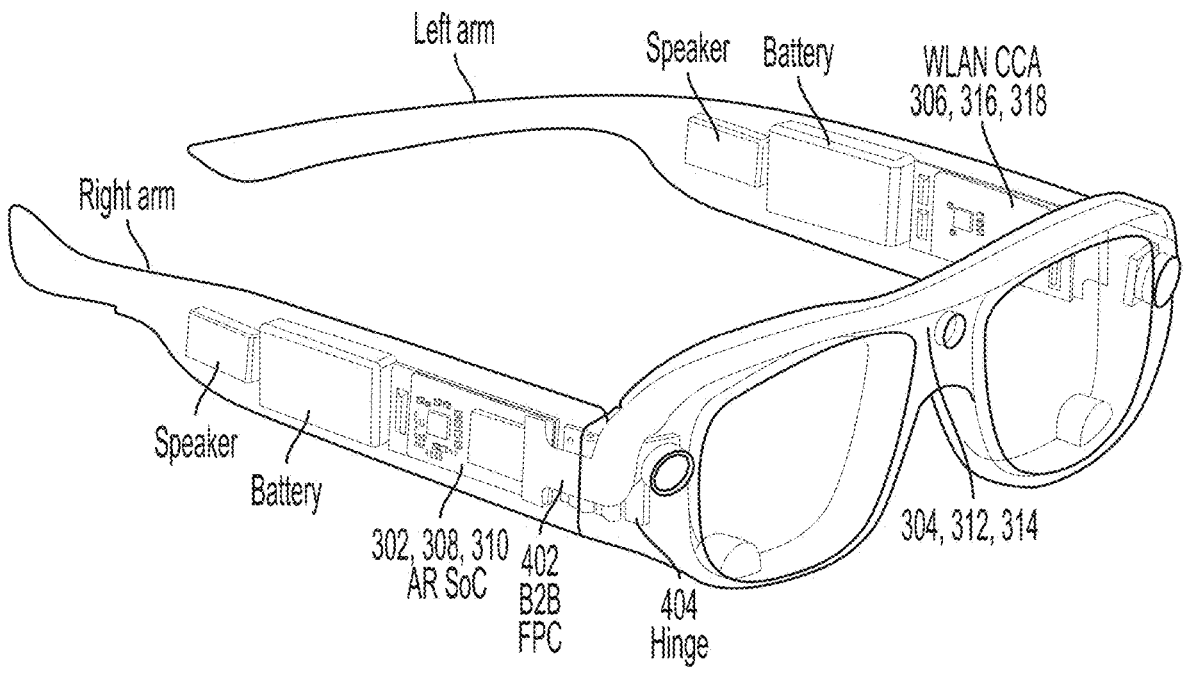
Figure 4B:
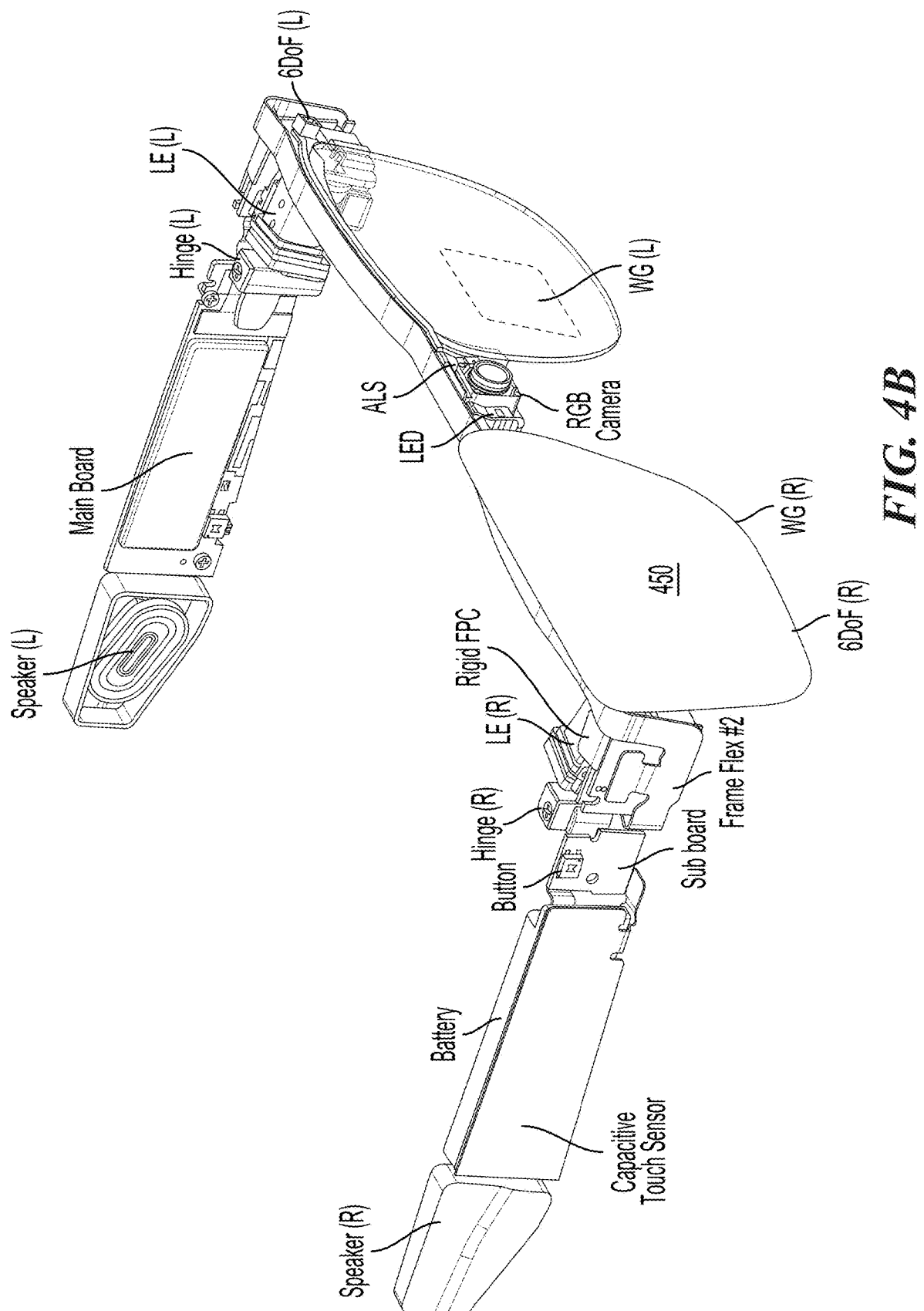

FIGS. 3, 4A, and 4B are diagrams illustrating placement of components in a wearable device with an eyeglasses form factor, in accordance with aspects of the present disclosure. As seen in the example of FIG. 3, a master SoC 308 and master power management IC (PMIC) 310 may reside on the first PCB 302 (also referred to as CCA—circuit card assembly) in one arm of the glasses, the camera and sensor co-processor 312 and associated PMIC 314 may reside on the second PCB 304 on the bridge of the eyeglasses, and the connectivity processor 316 and associated PMIC 318 may reside on the third PCB 306 on another arm of the glasses. Location of batteries and speakers are also shown in FIGS. 3, 4A, and 4B. A board-to-board (B2B) flexible printed circuit (FPC) connector 402 couples the first PCB 302, the second PCB 304, and the third PCB 306 across hinges 404 (only one labelled) of the eyeglasses. FIG. 4 additionally illustrates glasses with right and left waveguides WG (L) and WG (R) and left and right light engines LE (L) and LE (R). A right electrochromic layer 450 and a left electrochromic layer (not shown), as well as an ambient light sensor (ALS) are also provided. Right and left six degree of freedom (DOF) cameras are also provided. FIG. 4B is an implementation example of a system where connectivity systems, such as WLAN or wireless wide area network (WWAN) circuitry, is placed on the non-SoC arm of the glasses.

Figure 5A:
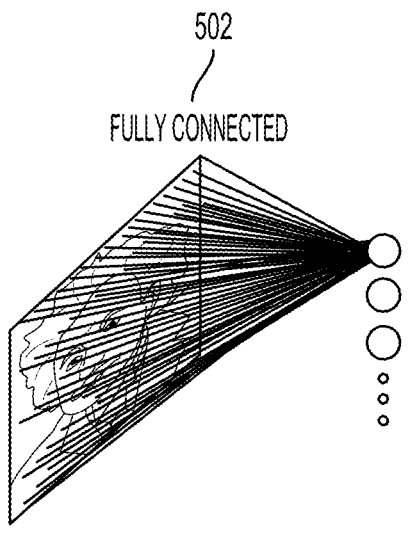
FIGS. 5A, 5B, and 5C are diagrams illustrating a neural network, in accordance with various aspects of the present disclosure.
Figure 5B:
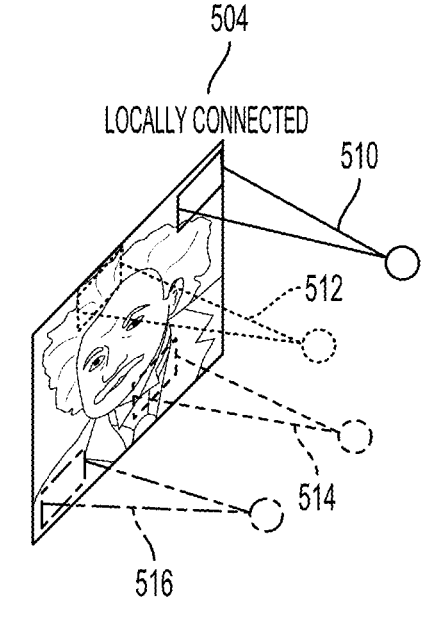

According to aspects of the present disclosure, machine learning techniques may be employed for controlling electrochromic lenses. In some implementations, a neural network may be employed. The connections between layers of a neural network may be fully connected or locally connected. FIG. 5A illustrates an example of a fully connected neural network 502. In a fully connected neural network 502, a neuron in a first layer may communicate its output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer because the higher layer neurons in a given region may receive inputs that are tuned through training to the properties of a restricted portion of the total input to the network.

Figure 5C:
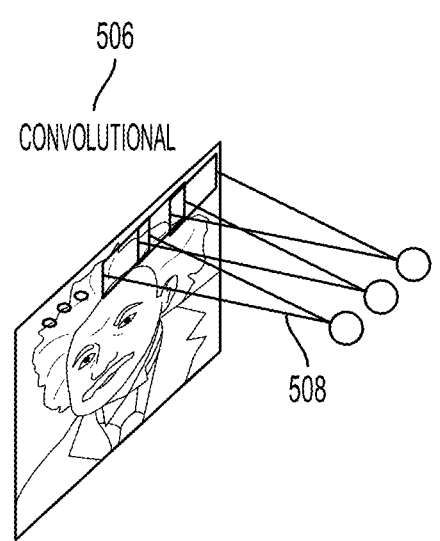

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (e.g., 508). Convolutional neural networks may be well suited to problems in which the spatial location of inputs is meaningful. One type of convolutional neural network is a deep convolutional network (DCN). The DCN may be trained with supervised learning. During training, the DCN may be presented with an image and a forward pass may then be computed to produce an output. The DCN may include a feature extraction section and a classification section. Upon receiving the image, a convolutional layer may apply convolutional kernels to the image to generate a first set of feature maps. The convolutional kernels may also be referred to as filters or convolutional filters.

A first set of feature maps may be subsampled by a max pooling layer (not shown) to generate a second set of feature maps. The max pooling layer reduces the size of the first set of feature maps. That is, a size of the second set of feature maps, such as 14×14, is less than the size of the first set of feature maps, such as 28×28. The reduced size provides similar information to a subsequent layer while reducing memory consumption. The second set of feature maps may be further convolved via one or more subsequent convolutional layers to generate one or more subsequent sets of feature maps. The second set of feature maps may be convolved to generate a first feature vector. Furthermore, the first feature vector is further convolved to generate a second feature vector. Each feature of the second feature vector may include a number that corresponds to a possible feature of the image. A softmax function may convert the numbers in the second feature vector to a probability. As such, an output of the DCN may be a probability of the image including one or more features.

Before training, the output produced by the DCN may likely be incorrect. Thus, an error may be calculated between the output and a target output. The target output is the ground truth of the image. The weights of the DCN may then be adjusted so the output of the DCN is more closely aligned with the target output. To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the DCN may yield an output that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 520) receiving input from a range of neurons in the previous layer (e.g., feature maps 518) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
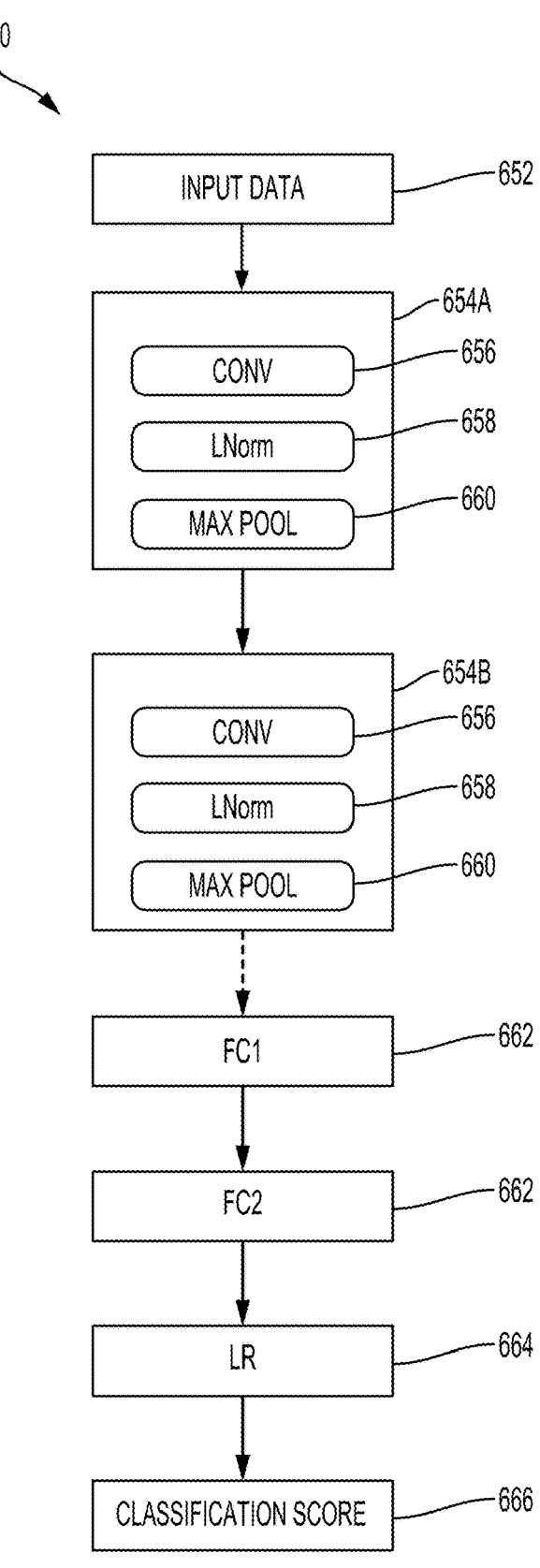
FIG. 6 is a block diagram illustrating an exemplary deep convolutional network (DCN), in accordance with various aspects of the present disclosure.

FIG. 6 is a block diagram illustrating a deep convolutional network (DCN) 650. The DCN 650 may include multiple different types of layers based on connectivity and weight sharing. As shown in FIG. 6, the DCN 650 includes the convolution blocks 654A, 654B. Each of the convolution blocks 654A, 654B may be configured with a convolution layer (CONV) 656, a normalization layer (LNorm) 658, and a max pooling layer (MAX POOL) 660. Although only two of the convolution blocks 654A, 654B are shown, the present disclosure is not so limiting, and instead, any number of the convolution blocks 654A, 654B may be included in the DCN 650 according to design preference.

The convolution layers 656 may include one or more convolutional filters, which may be applied to the input data to generate a feature map. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 102 or GPU 104 of an SoC 100 (e.g., FIG. 1) to achieve high performance and low power consumption. In alternative embodiments, the parallel filter banks may be loaded on the DSP 106 or an ISP 116 of an SoC 100. In addition, the DCN 650 may access other processing blocks that may be present on the SoC 100, such as sensor processor 114 and navigation module 120, dedicated, respectively, to sensors and navigation.

The DCN 650 may also include one or more fully connected layers 662 (FC1 and FC2). The DCN 650 may further include a logistic regression (LR) layer 664. Between each layer 656, 658, 660, 662, 664 of the DCN 650 are weights (not shown) that are to be updated. The output of each of the layers (e.g., 656, 658, 660, 662, 664) may serve as an input of a succeeding one of the layers (e.g., 656, 658, 660, 662, 664) in the DCN 650 to learn hierarchical feature representations from input data 652 (e.g., images, audio, video, sensor data and/or other input data) supplied at the first of the convolution blocks 654A. The output of the DCN 650 is a classification score 666 for the input data 652. The classification score 666 may be a set of probabilities, where each probability is the probability of the input data including a feature from a set of features. Although a convolutional network is described, other types of networks, such as transforms, recurrent, long short term memory (LSTM), etc. may be used instead of or in addition to a convolution network.

Figure 7:
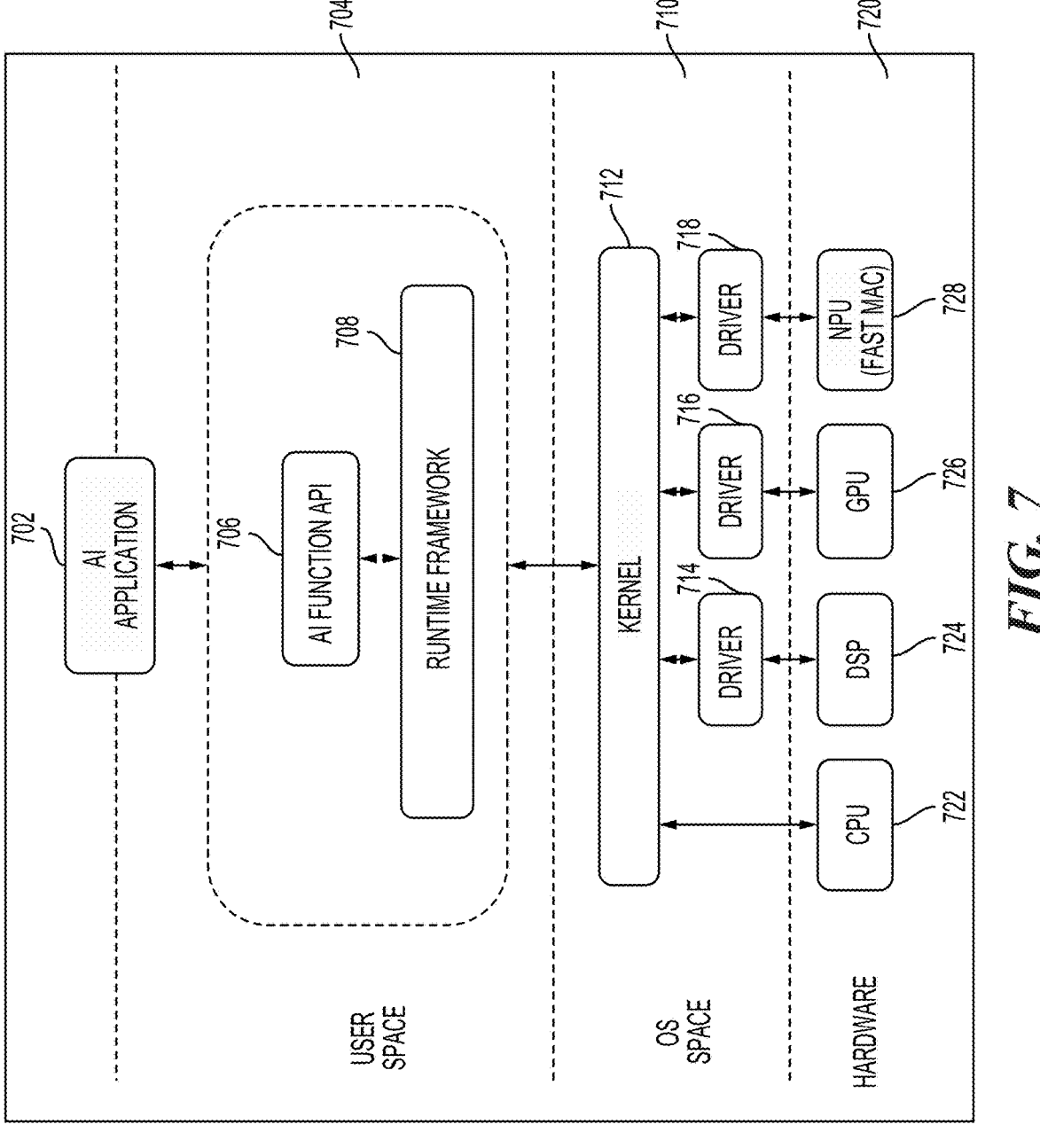
FIG. 7 is a block diagram illustrating an exemplary software architecture that may modularize artificial intelligence (AI) functions, in accordance with various aspects of the present disclosure.

FIG. 7 is a block diagram illustrating an exemplary software architecture 700 that may modularize artificial intelligence (AI) functions. Using the architecture 700, applications may be designed that may cause various processing blocks of an SoC 720 (for example, a CPU 722, a DSP 724, a GPU 726 and/or an NPU 728) to support electrochromic lens (or film) control by an AI application 702, according to aspects of the present disclosure. The architecture 700 may, for example, be included in a computational device, such as AR glasses.

The AI application 702 may be configured to call functions defined in a user space 704 that may, for example, provide for the detection and recognition of a scene indicative of the location at which the computational device including the architecture 700 currently operates. The AI application 702 may, for example, configure a microphone and a camera differently depending on whether the recognized scene is an office, a lecture hall, a restaurant, or an outdoor setting such as a lake. The AI application 702 may make a request to compiled program code associated with a library defined in an AI function application programming interface (API) 706. This request may ultimately rely on the output of a deep neural network configured to provide an inference response based on video and positioning data, for example.

The run-time engine 708, which may be compiled code of a runtime framework, may be further accessible to the AI application 702. The AI application 702 may cause the run-time engine 708, for example, to request an inference at a particular time interval or triggered by an event detected by the user interface of the AI application 702. When caused to provide an inference response, the run-time engine 708 may in turn send a signal to an operating system in an operating system (OS) space 710, such as a Kernel 712, running on the SoC 720. In some examples, the Kernel 712 may be a LINUX Kernel. The operating system, in turn, may cause electrochromic lens control to be performed on the CPU 722, the DSP 724, the GPU 726, the NPU 428, or some combination thereof. The CPU 722 may be accessed directly by the operating system, and other processing blocks may be accessed through a driver, such as a driver 714, 716, or 718 for, respectively, the DSP 724, the GPU 726, or the NPU 728. In the exemplary example, the deep neural network may be configured to run on a combination of processing blocks, such as the CPU 722, the DSP 724, and the GPU 726, or may be run on the NPU 728.

For wider market adoption, augmented reality (AR) glasses, artificial intelligence glasses, or smart glasses (more generally referred to as AR glasses) should be lightweight with a small form factor (e.g., sleek form factor). In fact, original equipment manufacturers (OEMs) may specify maximum dimension limits to achieve the sleek form factor. The sleek form factor, however, restricts chip count, chip package size, battery size, and battery capacity. The printed circuit board (PCB) inside the side arm drives the overall product size. The main system-on-a-chip (SoC) and power management integrated circuit (PMIC) package sizes dictate the overall PCB size on each arm. To achieve dimension targets, preferably only one PMIC with associated passive devices should be placed on the PCB due to a Y-dimension limit. Moreover, lower power consumption may improve the user experience by allowing a lower battery capacity and resulting smaller battery thus resulting in a lower weight, therefore more comfortable device.

For next generation augmented reality chips, the SoC feature set is increasing. The PCB size specifications, however, are very stringent. In fact, the SoC package size specification will decrease over time, forcing a PMIC size reduction. With the increased feature set, power consumption of each core device and associated power rail will correspondingly increase, which in turn requires additional power supplies or regulators. To provision more regulators, either multiple PMICs are added or a larger single PMIC is introduced. Both solutions increase the PCB Y-dimension, which is detrimental for sleek glasses.

Aspects of the present disclosure achieve significant power savings and improve display image quality using ambient light sensors (ALS), an electrochromic (EC) film or lens, a digital-to-analog converter (DAC), a display processor unit (DPU), and a machine learning embedded neural processing unit (eNPU). Microprojector systems with optically see through lenses, or waveguides, exhibit high power consumption under varying lighting conditions. While indoor lighting allows microprojectors to generate display images with reasonable power consumption for wearable glasses or goggles, outdoor lighting conditions necessitate a substantial increase in output brightness, ranging from twice to five times, depending on the ambient light. This increase in brightness results in a corresponding rise in power consumption from the device battery.

Ambient light sensors are photodetectors used in mobile devices, automotive displays, and liquid crystal display (LCD) televisions (TVs) to sense the amount of ambient light present and appropriately adjust the device's screen brightness. Electrochromic (EC) film or lenses are materials that change their optical properties, such as transparency and color, in response to an electrical stimulus, allowing for dynamic control of light transmission. Digital-to-analog converters (DACs) utilize machine learning algorithms to optimize their performance by adapting to real-time data and usage patterns. An embedded Neural Processing Unit (eNPU) is a specialized hardware component (e.g., the NPU 108 of FIG. 1) designed to accelerate machine learning tasks directly on a device, such as a smartphone, wearable, or Internet of things (IoT) device. Unlike general-purpose central processing units (CPUs), NPUs are optimized for the parallel processing required by neural networks, making them much more efficient for these tasks.

A display processor unit (DPU) (e.g., the multimedia engine 112 of FIG. 1) is a specialized hardware component designed to reduce power consumption by optimizing backlight control and signal scaling, to manage color to ensure accurate color reproduction, to provide dynamic range adjustment for efficient tone mapping, which adjusts the dynamic range for better viewing in various lighting conditions, and works alongside the graphics processing unit (GPU) 104 to deliver high definition (HD) video playback and smooth graphics. A microprojector, also known as a light engine assembly (LEA) in the context of glasses with displays, is a compact projection device designed to project images or videos into waveguides for augmented reality (AR) glasses. Waveguides are translucent optical elements that guide waves, such as light or electromagnetic waves, by restricting the transmission of energy to one direction.

Figure 9:
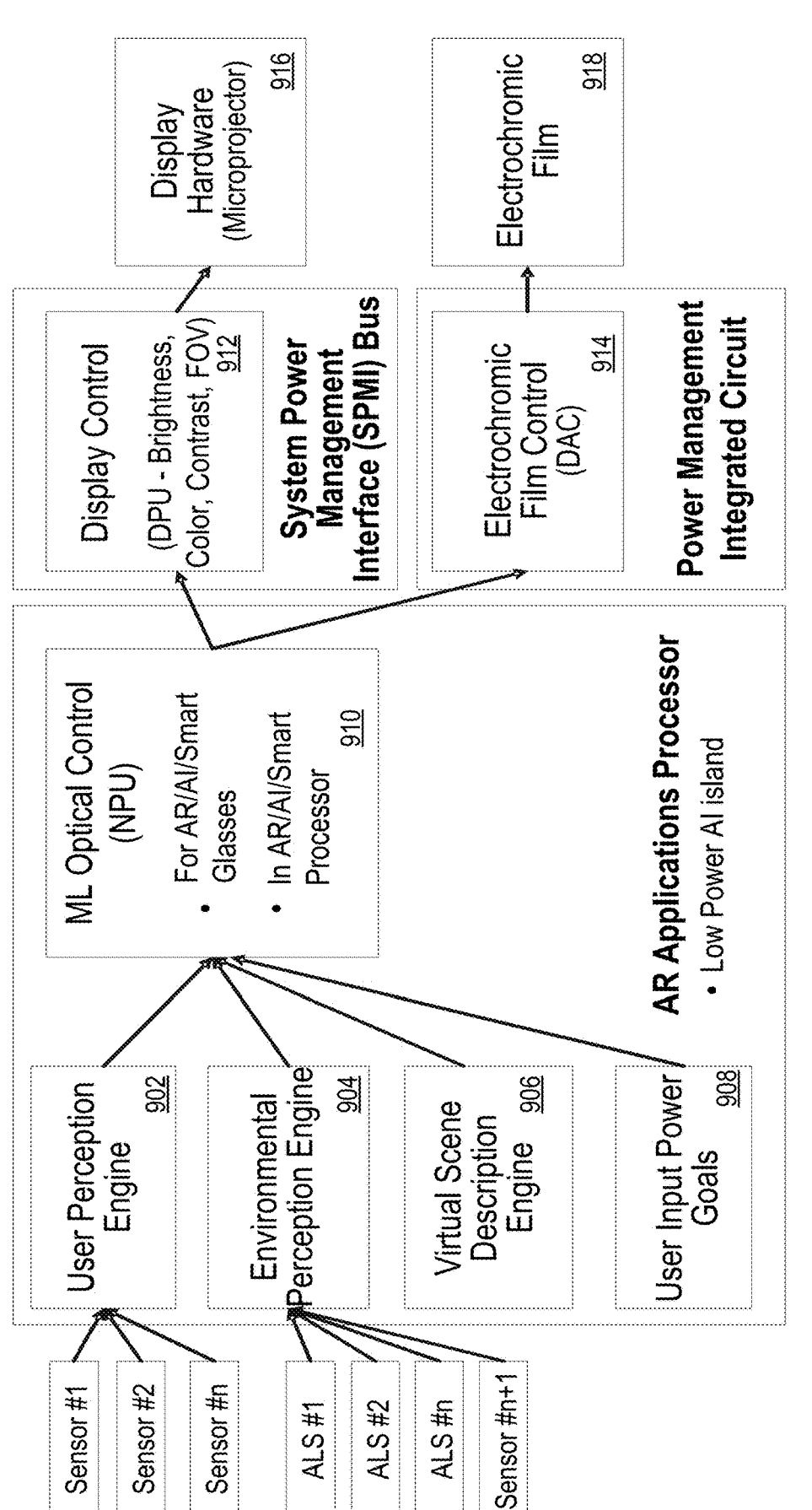
FIG. 9 is a block diagram illustrating an apparatus for controlling an electrochromic lens (or film) for augmented reality glasses, in accordance with various aspects of the present disclosure.
Figure 10:
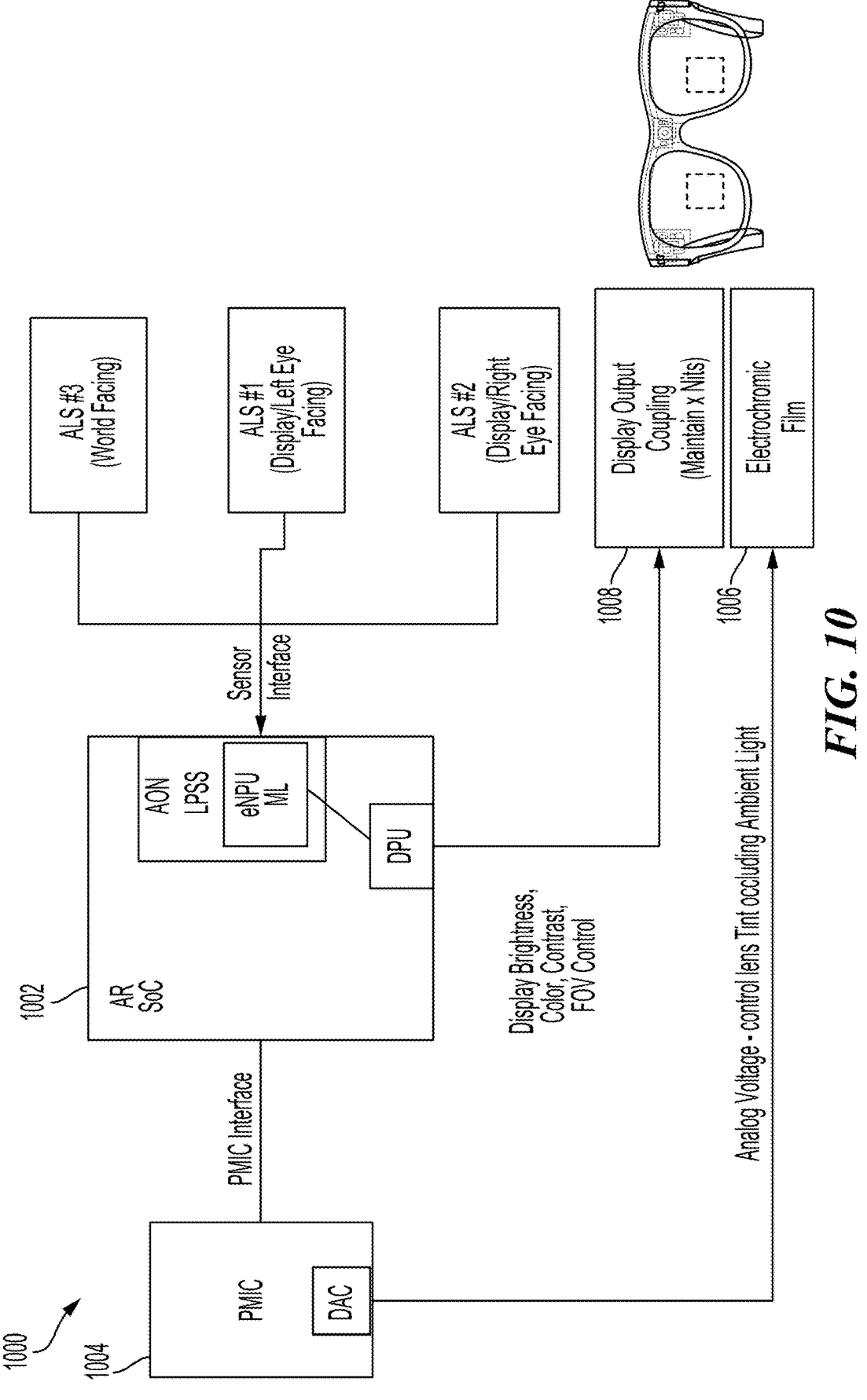
FIG. 10 is a block diagram illustrating an augmented reality (AR) display system with an electronic dimming layer, in accordance with various aspects of the present disclosure.

According to aspects of the present disclosure, a wearable device. The wearable device may include means for receiving, means for controlling, means for displaying, means for predicting, and means for adapting. In one configuration, the receiving means, the controlling means, the displaying means, the predicting means, and the adapting means may be the augmented reality (AR) applications processor, AR SoC 1002, display control block 912, display processing unit (DPU), neural processing unit (NPU), embedded NPU (eNPU), power management integrated circuit (PMIC), digital-to-analog converter (DAC), always on low power subsystem (AON LPSS), display hardware 916, electrochromic film 918, 1006, and/or display output coupling 1008, as shown in FIGS. 9 and 10. In other aspects, the aforementioned means may be any structure or any material configured to perform the functions recited by the aforementioned means.

Figure 8:
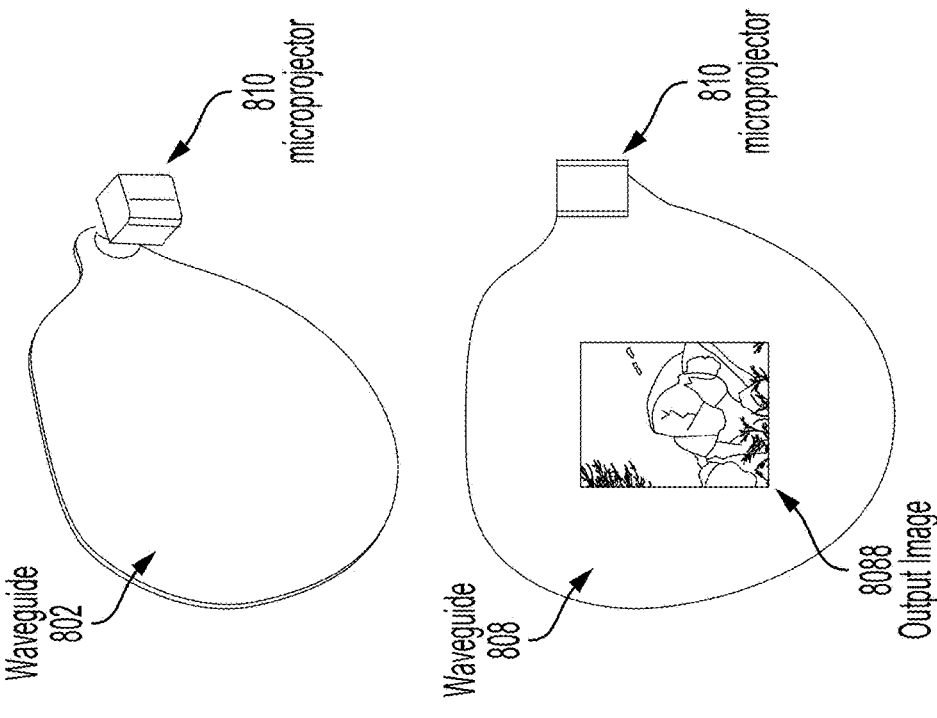
FIG. 8 is a diagram illustrating a light engine assembly (LEA), in accordance with various aspects of the present disclosure.
Figure 8:
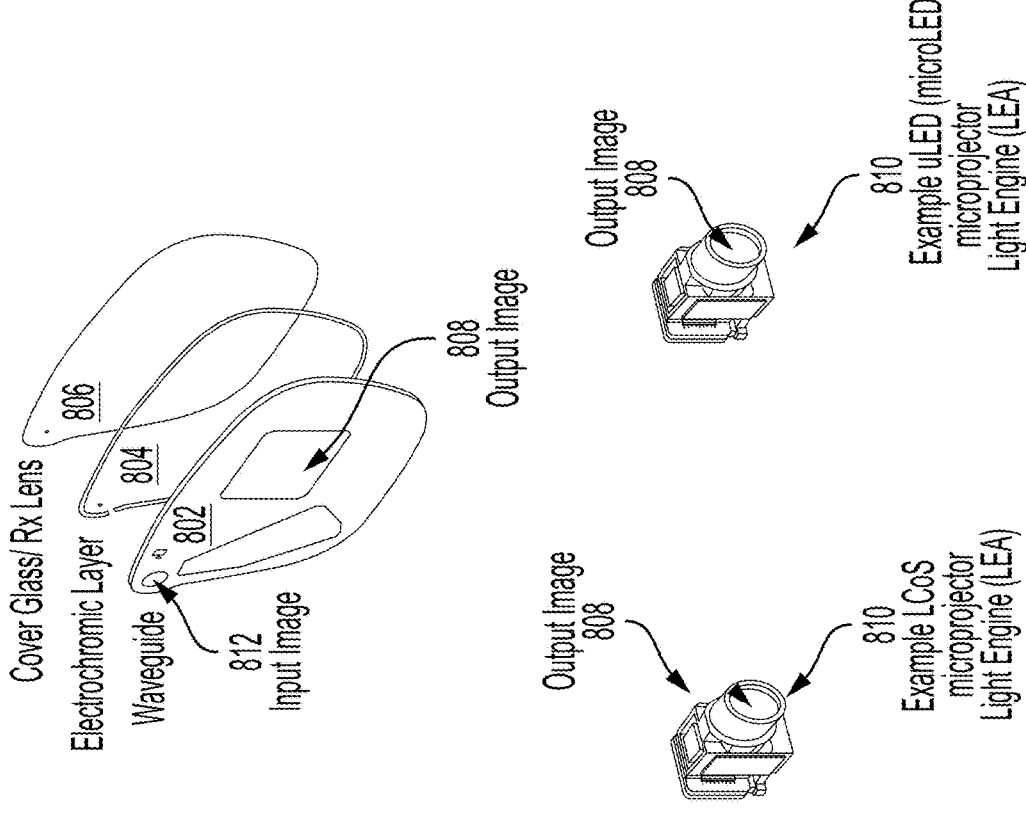

FIG. 8 is a diagram illustrating a light engine assembly (LEA), in accordance with various aspects of the present disclosure. In the example of FIG. 8, a waveguide 802, an electrochromic layer 804, and cover glass or a prescription lens 806 may fit within a frame of AR glasses, such as shown in FIG. 4B. The waveguide 802 displays an output image 808 generated by a microprojector 810. In some implementations, the microprojector 810 may be a micro-light emitting diode (uLED) microprojector or a liquid crystal on silicon (LCoS) based microprojector. The waveguide 802 is coupled to the microprojector 810 via input coupling gratings 812, carrying an input image. Two sets of expansion gratings (not shown) move the image from the small input coupling gratings 812 and expand to a larger (e.g., 12 mm×12 mm) output image 808 for the user. The waveguide 802 rotates the small image 180 degrees and expands the rotated image for the user's eye.

A self-learning eNPU leverages sensor inputs and machine learning techniques to dynamically adjust the electrochromic film/lens tint and the microprojector color and brightness output based on real-time ambient light sensing, usage patterns, and environmental conditions. By continuously analyzing the display's operational scene data, user sensors, environmental sensors, and user power goals, the eNPU predicts and adapts to the optimal voltage levels specified for different display states, thereby reducing power waste and improving display image quality. For image quality, with improvements in contrast, color composition, and brightness, the user experience with outdoor display readability is enhanced with significant power savings.

In some aspects, the microprojector is fitted with a mechanical field of view (FOV) adjustment (e.g., micro-electromechanical system (MEMS) controlled) to trade off image FOV for brightness to save additional power when the image FOV is not critical.

It is noted that the control of ambient light to a user's eye may also enhance eye tracking, which is valuable for contextual awareness in AR glasses.

The power management techniques of the present disclosure not only extend the battery life of portable devices but also contribute to the development of more sustainable and energy-efficient electronic systems.

Outdoor environments often have high levels of ambient light, especially in direct sunlight. These high levels of ambient light can wash out a projected image, making it difficult to see. To overcome this issue, microprojectors need a high lumen count to ensure the image remains visible. To achieve sufficient brightness in outdoor conditions, microprojectors significantly increase their output, which in turn increases power consumption. This can be particularly challenging for battery-operated devices like wearable glasses or goggles. The contrast ratio, which is the difference between the brightest and darkest parts of an image, significantly affects image quality. High levels of ambient light can reduce the effective contrast ratio, which is inherently low in optically see through or transparent display systems, making the image appear less vibrant, less bright, and less detailed. The choice of projection surface or medium greatly affects image quality. Optically see through, or waveguide, systems have inherently low nits/luminous efficiency due to the reflective or diffractive image expansion gratings in a transparent lens. To improve image quality in an optically see through device, an occluding visor may be attached. However, the visor impedes the objective of being optically see through. Therefore, tinting the lens to reduce ambient light to the user's eye may provide a better balance of maintaining optically see through displays and good image quality. Direct sunlight can cause glare on the lens and add reflections in the projection medium, further diminishing image quality.

Aspects of the present disclosure address these issues by controlling AR glass display systems for improved performance across ambient lighting conditions. The techniques of the present disclosure improve performance with lower power in varying ambient lighting conditions. Electrochromic lens (or film) control reduces power, and improves display brightness, display color, and display contrast in optically see through wearable devices, such as AR glasses.

Use cases for the techniques of the present disclosure include walking from an indoor lighting scene to an outdoor lighting scene, looking out of a window, and driving in a car with side lighting conditions. Another use case is when content is overlaid under the influence of ambient lighting conditions, such as direct sunlight hitting the eyes, as such glare causes a significant change in perception of the image. Other use cases include nighttime driving with a user's eyes adapted to dark ambient light suddenly needing to switch to bright AR content, and night driving when a user's eyes are suddenly hit with bright headlights from oncoming cars disturbing any content shown.

Aspects of the present disclosure improve AR glass displays, or other graphical display systems with varying ambient lighting conditions, for example, transitioning from outdoor to indoor lighting conditions and vice versa. The improvements of the present disclosure ensure overlaid user interface (UI) and content, such as text, images, and video, are legible. For conditions with high levels of light, such as daylight, to achieve image visibility, the display system increases the amount of light, therefore increasing power, to the display hardware. By introducing dynamic control of an electrochromic film/lens, the display brightness need not be increased, therefore improving device capabilities toward all day wear and also improving image quality.

During the day, a high dynamic range exists with reflected and direct lighting conditions. At night, a low level of ambient light is present. Because sleek and modern AR glasses have transparent lenses with an integrated display, and the perception of light by humans is complex and non-linear, solutions are needed to improve device power consumption and display quality. Aspects of the present disclosure help achieve the goals of all day wear with high image quality.

Aspects of the present disclosure introduce closed loop control of electrochromic film and displays on AR glass display systems by assessing user, scene, and perception information. The techniques of the present disclosure combine display and electrochromic film settings for best viewing with the lowest power consumption. Per eye display settings may be controlled for binocular systems. That is, each left and right display system may be independently controlled in a binocular AR glass display system. Moreover, content and the UI may be dynamically adapted based on ambient lighting conditions. User, environmental, and scene perception may be input to a machine learning (ML) engine to learn usage patterns and infer optimal settings. Ambient scene lighting may be detected with multiple sensors.

FIG. 9 is a block diagram illustrating an apparatus for controlling an electrochromic lens (or film) for augmented reality glasses, in accordance with various aspects of the present disclosure. In the example of FIG. 9, a user perception engine 902 receives data measured by a number (n) of sensors. First and second sensors (e.g., sensor #1 and sensor #2) may face towards a user to measure light levels at the user's eyes. Eye tracking cameras or sensors (not shown) may also be provided. At least one forward facing sensor (e.g., sensor #n) detects what the user sees.

An environmental perception engine 904 receives data measured by a number (n) of ambient light sensors (ALSs), where the number (n) of ambient light sensors is not necessarily the same as the number of sensors providing data to the user perception engine 902. The ambient light sensors (e.g., ALS #1 . . . ALS #n) may be photodetectors, as discussed above, or may be low resolution cameras that adjust based on what the user sees. For example, if the user sees a whiteboard in a bright room, dimming may occur. A six degree of freedom (DOF) camera (e.g., sensor #n+1) may also provide input to the environmental perception engine 904.

A virtual scene description engine 906 may indicate what is being rendered to a machine learning (ML) optical control block 910. Examples of rendered content may be simple text or video. Examples include a battery status and a heartbeat, with each displayed in a different color. The virtual scene description engine 906 may indicate how the rendered images are being used and how they are perceived across varying lighting conditions. For example, the virtual scene description engine 906 may indicate whether the projected image is color sensitive or whether it may be displayed more dimly. A high contrast scene may allow brightness to be lowered, whereas a low contrast scene may specify more brightness.

A user input power goals block 908 also provides input to the ML optical control block 910. The user input power goals block 908 indicates desired goals for the electrochromic lens control. For example, the goals may be to improve color and contrast, or the goals may indicate that color is not important. Based on a power goal where low battery status is detected, blue and red LEDs may be turned off such that only green content is displayed, thereby reducing power consumption.

The ML optical control block 910 may be implemented in an NPU or in another type of AR applications processor. The ML optical control block 910 receives input from the user perception engine 902, the environmental perception engine 904, the virtual scene description engine 906, and the user input power goals block 908. The ML optical control block 910 generates output to a display control block 912 and an electrochromic film control block 914. When the scene, content, and/or lighting change, the ML optical control block 910 generates output based on the changes. Each possible output may be scored during training. Reinforcement learning may also be employed. Training for different environments may indicate what to expect for particular lighting conditions, what type of light is in a scene, and other perception factors. More details of operation of the ML optical control block 910 will be described later.

The display control block 912 may be implemented in a DPU. The display control block controls brightness, color, contrast, and field of view (FOV) at display hardware (HW) 916, such as a microprojector. The display control block 912, the ML optical control block 910, the user perception engine 902, the environmental perception engine 904, the virtual scene description engine 906, and the user input power goals block 908 may all operate in an AR applications processor in a low power AI island.

The electrochromic film control block 914 receives data from the ML optical control block 910 via a bus, such as a system power management interface (SPMI). The electrochromic film control block 914 may be implemented in a digital-to-analog controller (DAC) within a power management processing unit (PMPU) of a power management integrated circuit (PMIC). The electrochromic film control block 914 controls tinting levels of an electronic tinting component, such as electrochromic film 918 (or alternatively liquid crystals). The tinting controlled by the electrochromic film control block 914 may be either regional or global tinting.

FIG. 10 is a block diagram illustrating an augmented reality (AR) display system 1000 with an electronic dimming layer, in accordance with various aspects of the present disclosure. In the example of FIG. 10, an AR system-on-a-chip (SoC) 1002 includes an always on low power subsystem (AON LPSS). The LPAI includes an embedded NPU (eNPU) that communicates with a display processor unit (DPU). The eNPU receives data from three ambient light sensors in the example of FIG. 10: ALS #1 that faces the display and the left eye, ALS #2 that faces the display and the right eye, and ALS #3 that faces the outside world. A sensor interface, (for example, an inter-integrated circuit (I2C) or improved inter-integrated circuit (I3C) bus) couples the sensors to the eNPU.

The AR SoC 1002 communicates with a PMIC 1004 via PMIC interface, such as a high speed system power management interface (SPMI) bus. The PMIC 1004 includes a digital-to-analog converter (DAC) that provides an analog voltage to an electrochromic film 1006. The analog voltage controls tinting levels of the electrochromic film 1006 to occlude ambient light based on the output from the eNPU.

The DPU of the AR SoC 1002 communicates with a display output coupling 1008. The display output coupling 1008 maintains brightness at a specified number (x) of nits in accordance with the DPU output. The DPU further controls color, contrast, and field of view levels for the display output coupling 1008.

Figure 11:
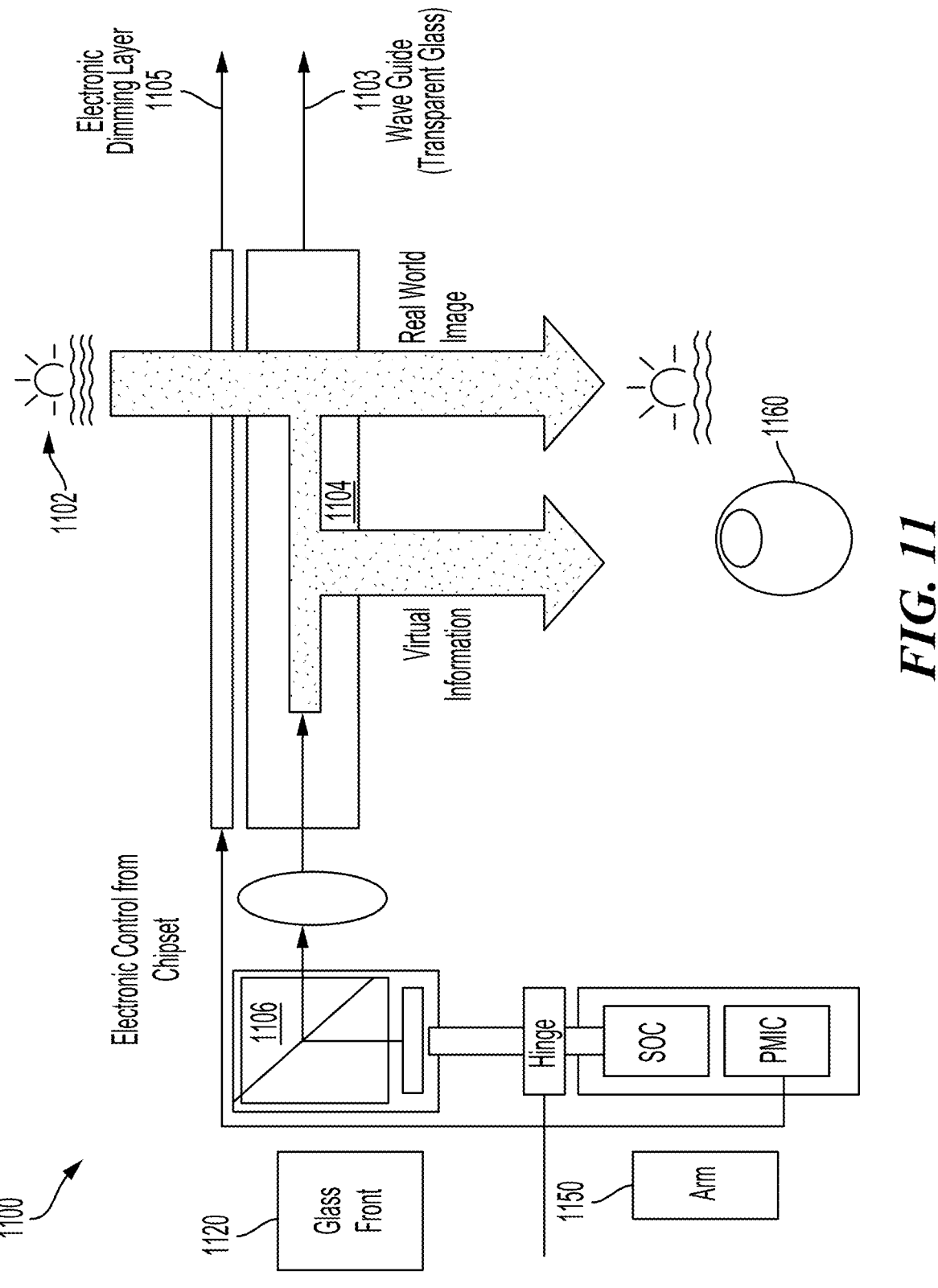
FIG. 11 is a diagram illustrating operation of electrochromic lens (or film) control in an AR display system, according to various aspects of the present disclosure.

FIG. 11 is a diagram illustrating operation of electrochromic lens (or film) control in an AR display system 1100, according to various aspects of the present disclosure. In the implementation of FIG. 11, the AR display system 1100 includes an SoC and PMIC in arms of the glasses for managing electronic control. Other variants of glasses where the SoC and PMIC reside in different locations, are also contemplated. In the example of FIG. 11, the AR display system 1100 includes a glass front 1120 connected to an arm 1150 via a hinge. At the glass front 1120, a real world image 1102 and virtual information 1104, which is projected on a waveguide 1103, are seen at an eye 1160 of a user. The real world image 1102 passes through an electronic dimming layer 1105, as well as the waveguide 1103, which may be transparent glass. The virtual information 1104 is projected from a microprojector 1106. A PMIC and an SoC reside within the arm 1150 of the AR display system 1100. The SoC controls the microprojector 1106 and the PMIC controls the electronic dimming layer 1105. Although a particular waveguide or equivalent optical element is shown in FIG. 11, the present disclosure is not so limited, as other types of optical elements are also contemplated.

Aspects of the present disclosure provide sensor integration including hardware integration and data fusion. Hardware integration ensures all sensors (e.g., ambient light, always sensing cameras, eye tracking, temperature, proximity, motion, microphones, and biosensors) are physically integrated into the smart glasses. Data fusion combines data from different sensors to create a comprehensive understanding of the environment and user context. Data fusion is accomplished with sensor fusion processing.

Data collection and preprocessing may include synchronized data collection, where data is collected from all sensors simultaneously to ensure temporal alignment. Data cleaning removes noise and irrelevant data from each sensor's output. Feature extraction identifies key features from each sensor's data. Key feature examples include ambient light intensity and variations, eye gaze direction and duration, temperature changes, proximity to objects, head movements, ambient sound levels, and physiological signals such as heart rate.

Model training may include supervised and unsupervised learning. Supervised learning uses labeled data to train models to predict an optimal lens tinting level based on the combined sensor inputs. For example, data may be labelled with the optimal tinting level for different lighting conditions, activities, and user states. Unsupervised learning identifies patterns and clusters in the data that can inform adjustments without explicit labels. Unsupervised learning may help discover new insights about user behavior and environmental conditions.

Model implementation may employ edge computing and power management. Edge computing refers to implementing the trained model on the smart glasses to process data in real-time. Edge computing ensures quick adjustments to lens tinting without relying on cloud processing. Power management optimizes the model to run efficiently on the device. Power management may involve lightweight models or pruning techniques to reduce computational load. Power saving modes may be implemented such that sensors and processors are only active when necessary.

Continuous learning and adaptation may include a feedback loop and adaptive processes. A feedback loop continuously collects data and user feedback to refine the model. The feedback loop may be implemented with periodic updates or on-device learning. Adaptive processes can adjust to new data and changing conditions over time.

An example workflow is now presented. First, initialization occurs by powering on the smart glasses and initializing all sensors. Next, data collection occurs in which sensors collect data on ambient light, user gaze, temperature, proximity, motion, sound, and physiological signals. Data fusion then combines and preprocesses sensor data to extract relevant features. For model inference, the machine learning model processes the fused data to predict the optimal lens tinting level. Lens adjustment may then occur such that the smart glasses adjust the lens tinting level in real-time based on the model prediction. Power management may occur such that sensors and processing units enter a low power mode when not actively needed. Continuous learning also occurs such that new data is periodically used to update and refine the model.

Aspects of the present disclosure introduce machine learning-based intelligent control of AR glass display systems based on ambient factors. Control of the display systems provides the ability to optimize for lower power operation. Individual control of left (or) right display systems in a binocular AR glasses display system is provided, along with the ability to adapt content to a wider range of ambient factors. Benefits include dynamic user interface or user experience (UI/UX) adjustments based on ambient factors, and an immersive AR experience, with improved display perception. For example, when displaying video, it may be desirable to darken the lenses, even when in an indoor environment. Other advantages include lower latency, opening new opportunities for dynamic display perception management by enabling an all-day wearable seamless user experience.

FIG. 12 is a flow diagram illustrating an example process for controlling an electrochromic lens (or film) for augmented reality glasses, in accordance with various aspects of the present disclosure. As shown in FIG. 12, in some aspects, the process 1200 may include receiving sensor data from a number of sensors comprising a first sensor facing away from a user, and a second sensor facing towards the user (block 1202). In some aspects, the sensors are ambient light sensors and/or image sensors. In other aspects, the sensors include a third sensor facing towards a first eye of the user, and the second sensor facing towards a second eye of the user.

In some aspects, the process 1200 may include controlling an electronic tinting component associated with a translucent optical element based on the sensor data. The electronic tinting component adjusts optical element tint occlusion (block 1204). In some aspects, the controlling of the electronic tinting component is performed by a power management integrated circuit (PMIC). The translucent optical element may comprise two display modules of an augmented reality device.

In some aspects, the process 1200 may include controlling at least one of a display brightness, display contrast, color composition, or field of view of a light engine assembly based on the sensor data (block 1206). In some aspects, controlling the light engine assembly is performed by a display processing unit (DPU). In some aspects, controlling of the electronic tinting component and the controlling of the light engine assembly are performed individually for two separate display modules of the translucent optical element.

In some aspects, the process 1200 may include displaying content with the light engine assembly (block 1208). In some aspects, the adapting the content being displayed is adapted based on the sensor data.

Example Aspects

Aspect 1: A computer processing method, comprising: receiving sensor data from a plurality of sensors comprising a first sensor facing away from a user, and a second sensor facing towards the user; controlling an electronic tinting component associated with a translucent optical element based on the sensor data, the electronic tinting component adjusting optical element tint occlusion; controlling at least one of a display brightness, display contrast, color composition, or field of view of a light engine assembly based on the sensor data; and displaying content with the light engine assembly.

Aspect 2: The method of Aspect 1, in which the plurality of sensors comprise ambient light sensors and/or image sensors.

Aspect 3: The method of Aspect 1 or 2, further comprising predicting electronic tinting settings and light engine assembly settings with a neural processing unit based on user perception data, environmental perception data, a virtual scene description, and a power target.

Aspect 4: The method of any of the preceding Aspects, further comprising controlling the field of view with a micro-electromechanical system (MEMS) device.

Aspect 5: The method of any of the preceding Aspects, in which the plurality of sensors further comprise a third sensor facing towards a first eye of the user, and the second sensor facing towards a second eye of the user.

Aspect 6: The method of any of the preceding Aspects, in which the controlling of the electronic tinting component is performed by a power management integrated circuit (PMIC) and the controlling the light engine assembly is performed by a display processing unit (DPU).

Aspect 7: The method of any of the preceding Aspects, in which the translucent optical element comprises two display modules of an augmented reality device.

Aspect 8: The method of any of the preceding Aspects, in which the controlling the electronic tinting component is further based on settings of the light engine assembly.

Aspect 9: The method of any of the preceding Aspects, in which the controlling of the electronic tinting component and the controlling of the light engine assembly are performed individually for two separate display modules of the translucent optical element.

Aspect 10: The method of any of the preceding Aspects, further comprising adapting the content being displayed based on the sensor data.

Aspect 11: An apparatus, comprising: at least one memory; and at least one processor coupled to the at least one memory, the at least one processor configured: to receive sensor data from a plurality of sensors comprising a first sensor facing away from a user, and a second sensor facing towards the user; to control an electronic tinting component associated with a translucent optical element based on the sensor data, the electronic tinting component adjusting optical element tint occlusion; to control at least one of a display brightness, display contrast, color composition, or field of view of a light engine assembly based on the sensor data; and to display content with the light engine assembly.

Aspect 12: The apparatus of Aspect 11, in which the plurality of sensors comprise ambient light sensors and/or image sensors.

Aspect 13: The apparatus of Aspect 11 or 12, in which the at least one processor is further configured to predict electronic tinting settings and light engine assembly settings with a neural processing unit based on user perception data, environmental perception data, a virtual scene description, and a power target.

Aspect 14: The apparatus of any of the Aspects 11-13, in which the at least one processor is further configured to control the field of view with a micro-electromechanical system (MEMS) device.

Aspect 15: The apparatus of any of the Aspects 11-14, in which the plurality of sensors further comprise a third sensor facing towards a first eye of the user, and the second sensor facing towards a second eye of the user.

Aspect 16: The apparatus of any of the Aspects 11-15, in which the at least one processor is further configured to control the electronic tinting component by a power management integrated circuit (PMIC) and control the light engine assembly by a display processing unit (DPU).

Aspect 17: The apparatus of any of the Aspects 11-16, in which the translucent optical element comprises two display modules of an augmented reality device.

Aspect 18: The apparatus of any of the Aspects 11-17, in which the at least one processor is further configured to control the electronic tinting component based on settings of the light engine assembly.

Aspect 19: The apparatus of any of the Aspects 11-18, in which the at least one processor is further configured to control the electronic tinting component and control the light engine assembly individually for two separate display modules of the translucent optical element.

Aspect 20: The apparatus of any of the Aspects 11-19, in which the at least one processor is further configured to adapt the content being displayed based on the sensor data.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general-purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A computer processing method, comprising:
receiving sensor data from a plurality of sensors comprising a first sensor facing away from a user, and a second sensor facing towards the user;
controlling an electronic tinting component associated with a translucent optical element based on the sensor data, the electronic tinting component adjusting optical element tint occlusion;
controlling at least one of a display brightness, display contrast, color composition, or field of view of a light engine assembly based on the sensor data;
displaying content with the light engine assembly; and
predicting electronic tinting settings and light engine assembly settings with a neural processing unit based on user perception data, environmental perception data, a virtual scene description, and a power target.

2. The method of claim 1, in which the plurality of sensors comprise ambient light sensors and/or image sensors.

3. The method of claim 1, further comprising controlling the field of view with a micro-electromechanical system (MEMS) device.

4. The method of claim 1, in which the plurality of sensors further comprise a third sensor facing towards a first eye of the user, and the second sensor facing towards a second eye of the user.

5. The method of claim 1, in which the controlling of the electronic tinting component is performed by a power management integrated circuit (PMIC) and the controlling the light engine assembly is performed by a display processing unit (DPU).

6. The method of claim 1, in which the translucent optical element comprises two display modules of an augmented reality device.

7. The method of claim 1, in which the controlling the electronic tinting component is further based on settings of the light engine assembly.

8. The method of claim 1 in which the controlling of the electronic tinting component and the controlling of the light engine assembly are performed individually for two separate display modules of the translucent optical element.

9. The method of claim 1, further comprising adapting the content being displayed based on the sensor data.

10. An apparatus, comprising:
at least one memory; and
at least one processor coupled to the at least one memory, the at least one processor configured;
to receive sensor data from a plurality of sensors comprising a first sensor facing away from a user, and a second sensor facing towards the user;
to control an electronic tinting component associated with a translucent optical element based on the sensor data, the electronic tinting component adjusting optical element tint occlusion;
to control at least one of a display brightness, display contrast, color composition, or field of view of a light engine assembly based on the sensor data;

to display content with the light engine assembly; and predict electronic tinting settings and light engine assembly settings with a neural processing unit based on user perception data, environmental perception data, a virtual scene description, and a power target.

11. The apparatus of claim 10, in which the plurality of sensors comprise ambient light sensors and/or image sensors.

12. The apparatus of claim 10, in which the at least one processor is further configured to control the field of view with a micro-electromechanical system (MEMS) device.

13. The apparatus of claim 10, in which the plurality of sensors further comprise a third sensor facing towards a first eye of the user, and the second sensor facing towards a second eye of the user.

14. The apparatus of claim 10, in which the at least one processor is further configured to control the electronic tinting component by a power management integrated circuit (PMIC) and control the light engine assembly by a display processing unit (DPU).

15. The apparatus of claim 10, in which the translucent optical element comprises two display modules of an augmented reality device.

16. The apparatus of claim 10, in which the at least one processor is further configured to control the electronic tinting component based on settings of the light engine assembly.

17. The apparatus of claim 10, in which the at least one processor is further configured to control the electronic tinting component and control the light engine assembly individually for two separate display modules of the translucent optical element.

18. The apparatus of claim 10, in which the at least one processor is further configured to adapt the content being displayed based on the sensor data.

* * * * *